United States Patent
Rowe et al.

(10) Patent No.: US 11,421,664 B1
(45) Date of Patent: Aug. 23, 2022

(54) ARTIFICIAL MUSCLE DRIVE UNITS WITH LOAD-BEARING SUPPORTS FOR IMPROVED PERFORMANCE

(71) Applicant: Toyota Motor Engineering & Manufacturing North America, Inc., Plano, TX (US)

(72) Inventors: Michael P. Rowe, Pinckney, MI (US); Shardul S. Panwar, Ann Arbor, MI (US); Maduran Palaniswamy, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/218,346

(22) Filed: Mar. 31, 2021

(51) Int. Cl.
| | |
|---|---|
| *F03G 7/06* | (2006.01) |
| *F15B 15/10* | (2006.01) |
| *F15B 21/06* | (2006.01) |
| *B25J 9/10* | (2006.01) |

(52) U.S. Cl.
CPC .............. *F03G 7/06* (2013.01); *F15B 15/103* (2013.01); *F15B 21/065* (2013.01); *B25J 9/1075* (2013.01)

(58) Field of Classification Search
CPC ........ F03G 7/06; F15B 21/065; F15B 15/103; B25J 9/1075
USPC .................................... 60/530; 310/508–509
See application file for complete search history.

(56) References Cited

U.S. PATENT DOCUMENTS

| | | | |
|---|---|---|---|
| 9,765,837 B2 | 9/2017 | Dastoor et al. | |
| 9,848,971 B2 | 12/2017 | Horton et al. | |
| 2003/0163206 A1* | 8/2003 | Yasui | B25J 9/0057 623/24 |
| 2003/0205045 A1* | 11/2003 | Peles | F15B 15/10 60/473 |
| 2006/0025693 A1* | 2/2006 | Sano | A61B 5/02141 600/490 |
| 2007/0129653 A1* | 6/2007 | Sugar | A61H 1/02 601/5 |
| 2012/0063000 A1 | 3/2012 | Batchko et al. | |
| 2012/0228991 A1 | 9/2012 | Vranish | |
| 2018/0154527 A1* | 6/2018 | Zhang | B25J 15/0028 |
| 2020/0200153 A1 | 6/2020 | Lima et al. | |
| 2021/0285471 A1* | 9/2021 | Keplinger | F15B 15/08 |

FOREIGN PATENT DOCUMENTS

CN      104175317 B      2/2017

* cited by examiner

*Primary Examiner* — Hoang M Nguyen
(74) *Attorney, Agent, or Firm* — Dinsmore & Shohl LLP

(57) ABSTRACT

An artificial muscle drive unit includes a base and an artificial muscle disposed on the base. The artificial muscle includes an expandable reservoir and a fluid. The fluid is movable within said expandable reservoir to switch the artificial muscle between a non-actuated state in which a dimension of the artificial muscle in a movement direction is a minimum value, and an actuated state, in which the dimension of the artificial muscle is a maximum value. The artificial muscle drive unit also includes a load-bearing support disposed on the base, the load-bearing support comprising a dimension in the movement direction that is greater than or equal to the minimum value.

20 Claims, 17 Drawing Sheets

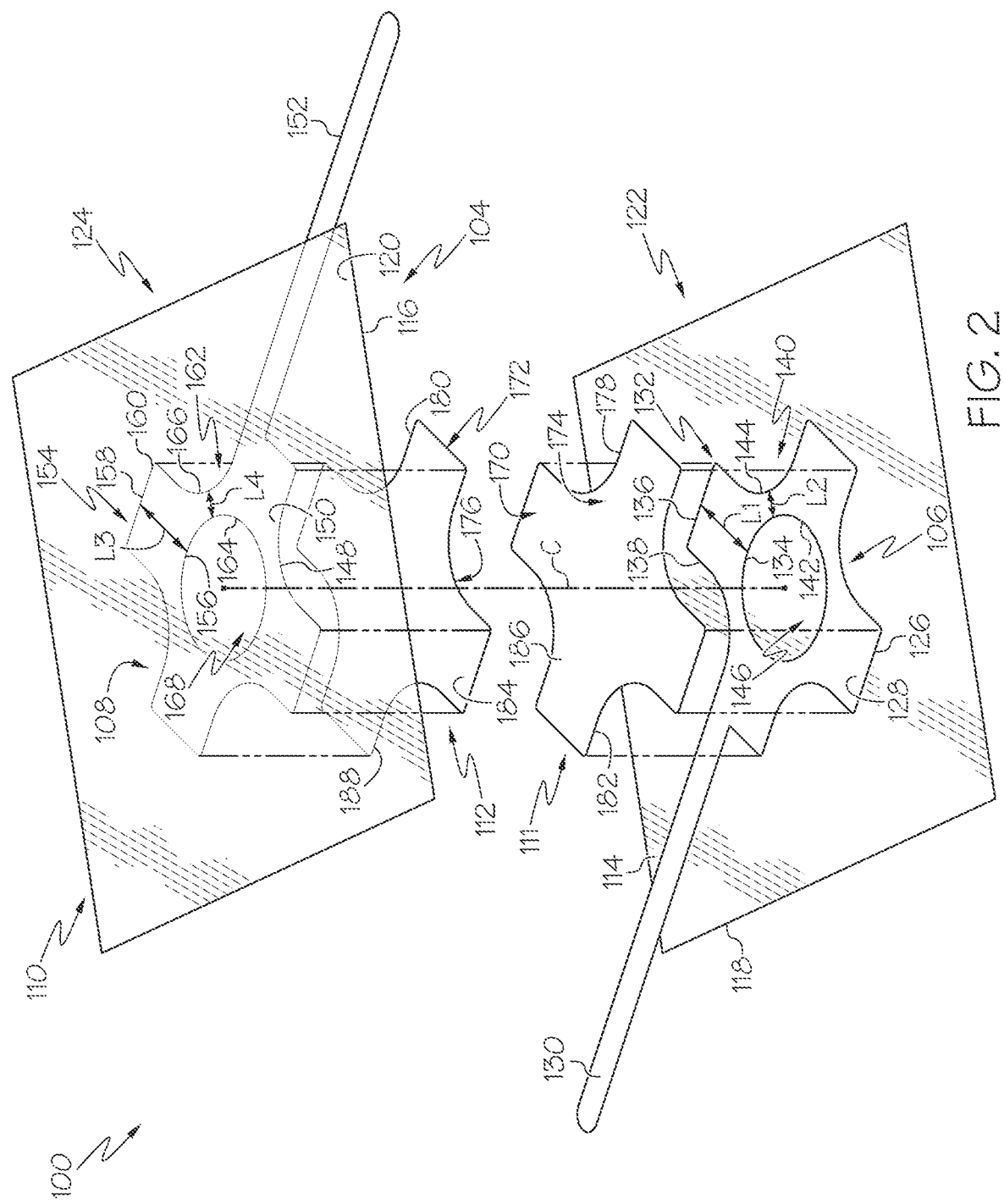

ated state. The artificial muscle device also includes
ARTIFICIAL MUSCLE DRIVE UNITS WITH LOAD-BEARING SUPPORTS FOR IMPROVED PERFORMANCE

TECHNICAL FIELD

The present specification generally relates to artificial muscle drive units with load-bearing supports for improved performance.

BACKGROUND

Current robotic technologies rely on rigid components, such as servomotors to perform tasks, often in a structured environment. This rigidity presents limitations in many robotic applications, caused, at least in part, by the weight-to-power ratio of servomotors and other rigid robotics devices. The field of soft robotics improves on these limitations by using artificial muscles and other soft actuators. Artificial muscles attempt to mimic the versatility, performance, and reliability of a biological muscle. Some artificial muscles rely on fluid-based actuators. For example, certain artificial muscles may introduce fluid into and out of a volume to expand or contract the artificial muscles to perform mechanical work on a load. The presence of a load may hinder operation of such fluid-based artificial muscles if the artificial muscles encounter the load in an unexpanded state.

Accordingly, a need exists for artificial muscle drive units that are structured to avoid the presence of loads hindering operation of the artificial muscles.

SUMMARY

In one embodiment, an artificial muscle drive unit includes a base and an artificial muscle disposed on the base. The artificial muscle includes an expandable reservoir and a fluid. The fluid is movable within said expandable reservoir to switch the artificial muscle between a non-actuated state in which a dimension of the artificial muscle in a movement direction is a minimum value, and an actuated state, in which the dimension of the artificial muscle is a maximum value. The artificial muscle drive unit also includes a load-bearing support disposed on the base, the load-bearing support comprising a dimension in the movement direction that is greater than or equal to the minimum value.

In another embodiment, an artificial muscle device includes one or more actuation platforms interleaved with one or more mounting platforms to form one or more actuation cavities between one or more platform pairs, each platform pair comprising an individual mounting platform and an individual actuation platform. One or more artificial muscles is disposed in each of the one or more actuation cavities. Each of the one or more artificial muscles includes expandable reservoir and a fluid. The fluid is movable within said expandable reservoir to switch the one or more artificial muscles between a non-actuated state in which a dimension of the artificial muscle in a movement direction is a minimum value, and an actuated state, in which the dimension is a maximum value in the movement direction. A load-bearing support is disposed in at least one of the one or more actuation cavities, the load-bearing support includes a dimension in the movement direction that is greater than or equal to the minimum value.

In another embodiment, an artificial muscle device includes one or more actuation platforms interleaved with one or more mounting platforms to form one or more actuation cavities between one or more platform pairs. Each platform includes an individual mounting platform and an individual actuation platform. The artificial muscle device also includes one or more artificial muscles disposed in each of the one or more actuation cavities. The one or more artificial muscles each include an expandable reservoir and a fluid. The fluid is movable within the expandable reservoir to actuate the one or more artificial muscles between a non-actuated state in which a dimension of the artificial muscle in a movement direction is a minimum value, and an actuated state, in which the dimension is a maximum value in the movement direction. The artificial muscle device also includes a load-bearing support disposed in at least one of the one or more actuation cavities, the load-bearing support comprising a dimension in the movement direction that is greater than or equal to the minimum value.

In yet another embodiment, a method of actuating an artificial muscle drive unit, the method includes positioning the artificial muscle drive unit relative to a load source such that the load source imparts a force on a load-bearing support of the artificial muscle drive unit. The load-bearing support is positioned relative to an artificial muscle of the artificial muscle drive unit such that the force is not directly imparted on an expandable reservoir of the artificial muscle when the artificial muscle is in a non-actuated state. The method also includes manipulating a fluid disposed within the expandable reservoir of the artificial muscle such that at least a portion of the expandable reservoir expands in a movement direction prior to encountering the force imparted on the load-bearing support and continues to expand in the movement direction upon encountering the force imparted by the load-bearing support, thereby imparting an artificial muscle force on the load source.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 schematically depicts an exploded view of an illustrative artificial muscle, according to one or more embodiments shown and described herein;

DETAILED DESCRIPTION

Embodiments described herein are directed to artificial muscle drive units including a base and an artificial muscle disposed on the base. The artificial muscle may be controllably deformable to impart a force on an external object (e.g., a load source) in a movement direction. The artificial muscle may include an expandable reservoir and a fluid, and the fluid may be movable within the expandable reservoir such that the artificial muscle can be switched from a non-actuated state, in which a distance between an external surface of the expandable reservoir and the base in the movement direction is a minimum value, to an actuated state, in which the distance between the external surface of the expandable reservoir and the base in the movement direction is a maximum value (assuming no load is encounter by the artificial muscle preventing expansion of the expandable reservoir). The artificial muscle drive units described herein further include a load-bearing support disposed on the base. The load-bearing support includes a dimension in the movement direction that is greater than or equal to the minimum value, and is positioned relative to the artificial muscle such that, when a load is applied to the artificial muscle drive unit, no force is imparted on the expandable reservoir when the artificial muscle is in the non-actuated state.

In embodiments, the artificial muscle may be in a partially activated state (e.g., in which the distance between the external surface of the expandable reservoir and the base in the movement direction is an intermediate value between the minimum value and the maximum value) when the expandable reservoir encounters a load. The avoidance of loads on the expandable reservoir when the artificial muscle is in the non-actuated state may facilitate a desired movement pattern of the fluid disposed therein to effectuate a transition from the non-actuated state towards the actuated state. That is, if the expandable reservoir were to encounter external forces in the non-actuated state, the distribution of the fluid therein may be effected, thereby inhibiting movement of the fluid in a pattern that maximizes expansion of the expandable reservoir in the movement direction. Avoidance of such disruptions on non-actuated artificial muscles may result in improved force and displacement outputs, resulting in performance improvements in the incorporating device.

Figure 1A:
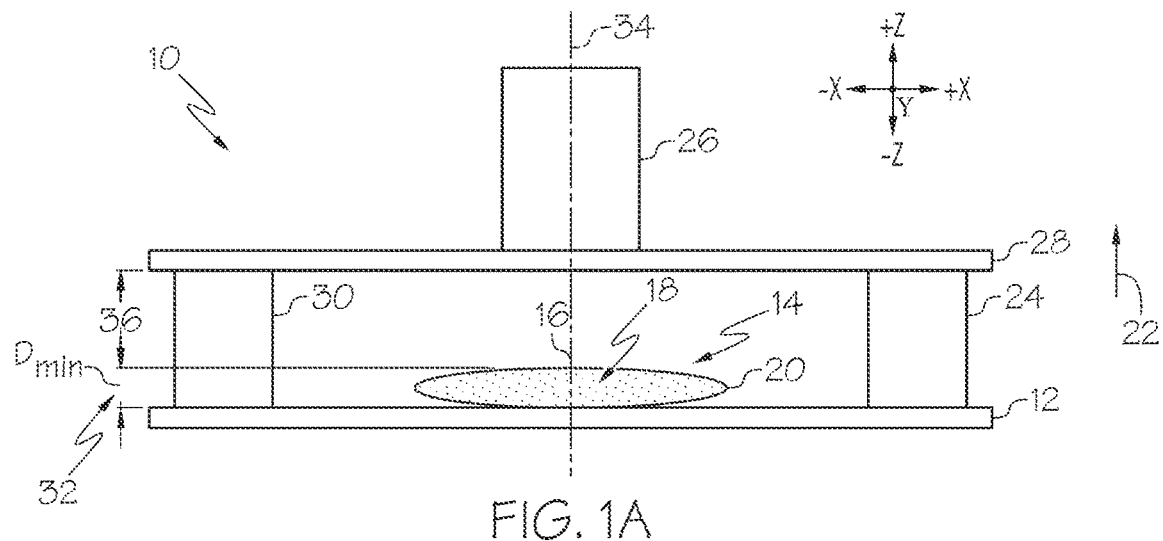
FIG. 1A schematically depicts an artificial muscle drive unit including a load-bearing support in a non-actuated state, according to one or more embodiments shown and described herein.
Figure 1B:
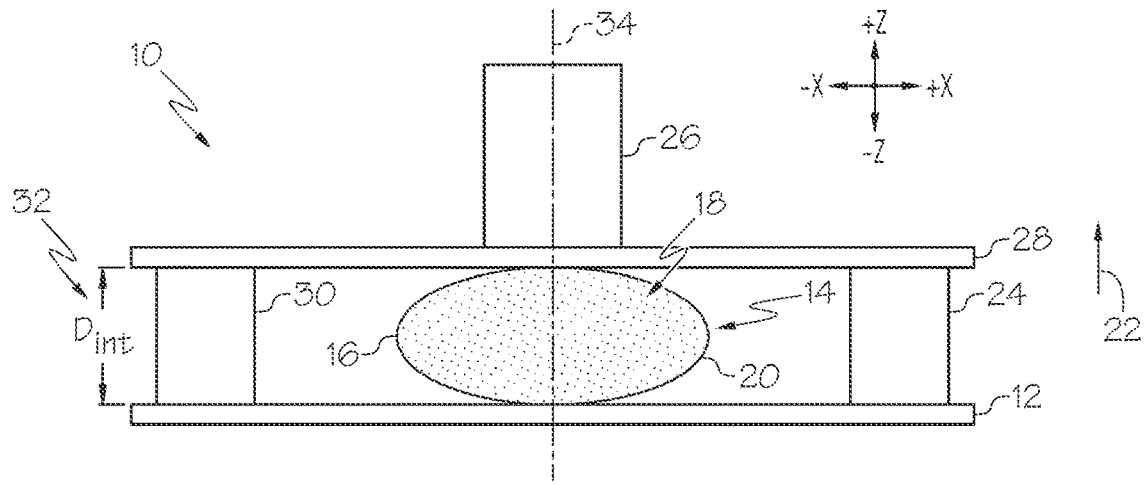
FIG. 1B schematically depicts the artificial muscle drive unit of FIG. 1A in a partially-actuated state, according to one or more embodiments shown and described herein.
Figure 1C:
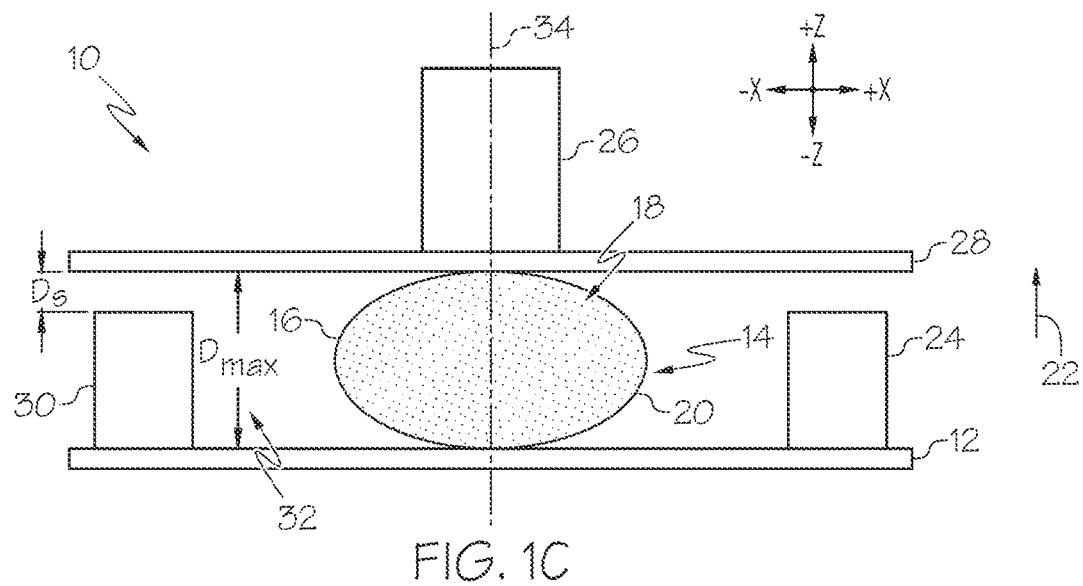
FIG. 1C schematically depicts the artificial muscle drive unit of FIG. 1A in a fully actuated state, according to one or more embodiments shown and described herein.

Referring now to FIGS. 1A, 1B, and 1C, an artificial muscle drive unit 10 is schematically depicted. The artificial muscle drive unit 10 includes a base 12 and an artificial muscle 14 disposed on the base 12. FIG. 1A depicts the artificial muscle drive unit 10 with the artificial muscle 14 in a non-actuated state. FIG. 1B depicts the artificial muscle drive unit 10 with the artificial muscle 14 in a partially actuated state. FIG. 1C depicts the artificial muscle drive unit 10 in an actuated state. The artificial muscle 14 includes an expandable reservoir 16 and a fluid 18 disposed in the expandable reservoir 16. The expandable reservoir 16 and fluid 18 may include variety of different forms depending on the implementation. For example, in embodiments, the artificial muscle 14 is in fluid communication with an external fluid source (e.g. a pump, not depicted) and the external fluid source may be controlled to adjust a volume of fluid contained within the expandable reservoir 16. In such embodiments, at least a portion of the expandable reservoir 16 may be constructed of a flexible material such that the expandable reservoir expands or contracts along a movement direction 22 in response to fluctuations in the amount of the fluid 18 disposed in the expandable reservoir 16.

In embodiments, the artificial muscle 14 includes a closed-fluid system, in which the volume of the fluid 18 disposed in the expandable reservoir 16 is fixed, but the distribution of the fluid 18 is manipulated to alter the shape of the expandable reservoir 16. In some such closed-fluid system embodiments, the expandable reservoir 16 comprises an entirety of a volume containing the fluid 18 (e.g., the expandable reservoir comprises an entire vessel holding the fluid 18). In some such closed-fluid system embodiments, the expandable reservoir 16 comprises a portion of a volume containing the fluid 18 (e.g., only a portion of the vessel holding the fluid 18—corresponding to the expandable reservoir—may move in the movement direction 22). For example, in embodiments, the expandable reservoir 16 comprises an electrode portion and an expandable portion, and an electrical potential between electrodes of the electrode portion may be adjusted to alter a spacing between the electrodes and manipulate a distribution of the fluid 18 to expand the expandable portion in the movement direction 22. In embodiments, the artificial muscle 14 comprises a hydraulically amplified self-healing electrostatic (HASEL) actuators described in the paper titled "*Hydraulically amplified self-healing electrostatic actuators with muscle-like performance*" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). In embodiments, the artificial muscle 14 comprises the artificial muscles 100, 100' described herein. It should be understood that the artificial muscle drive unit 10 may include any type of fluid-based artificial muscle and that the example artificial muscles described herein should not be interpreted to limit the applicability of the present disclosure to any particular type of artificial muscle.

Moreover, it should be understood that the artificial muscle drive unit 10 depicted in FIGS. 1A, 1B, and 1C includes only a single artificial muscle for purposes of discussion. In embodiments, artificial muscle drive unit 10 include a plurality of artificial muscles including any number (e.g., tens, hundreds, thousands, hundreds of thousands, etc.) of artificial muscles. Such a plurality of artificial muscles may be combined with one another in any structural arrangement. For example, in embodiments, the artificial muscle 14 depicted in FIGS. 1A, 1B, and 1C comprises a plurality of the artificial muscles 100 described herein that are arranged in an in any of the artificial muscle stacks 201, 301, 301' (FIGS. 6A-8) described herein or the layered actuation structure 500 (FIGS. 9A-11) described herein. While the example structures of such groupings of artificial muscles are described in detail herein, it should be understood that other artificial structures and arrangements are contemplated and within the scope of the present disclosure.

In embodiments, the volume and/or distribution of the fluid 18 within the expandable reservoir 16 is actively controlled to manipulate the shape of the expandable reservoir 16 such that the artificial muscle 14 generates a desired movement pattern and force. In the embodiment depicted in FIGS. 1A, 1B, and 1C, for example, the distribution of the fluid 18 is manipulated to alter a dimension 32 of the artificial muscle 14 in the movement direction 22 (e.g., so as to apply a force to an object 26 in contact with the artificial muscle drive unit 10 in the movement direction 22). The exact location within the artificial muscle 14 at which the dimension 32 is measured may vary depending on the implementation, depending on the design of the artificial muscle 14 and the force that the artificial muscle 14 is designed to impart on the object 26 in contact with the artificial muscle drive unit 10. In the depicted embodiment, for example, the dimension 32 is measured as a linear distance between different points on an external surface 20 of the artificial muscle 14 (e.g., the external surface 20 of the expandable reservoir 16) along a central axis 34 extending parallel to the movement direction 22. In embodiments, the central axis 34 may represent a position of maximum dimensional change between the non-actuated state depicted in FIG. 1A and the actuated state depicted in FIG. 1B due to the configuration of the artificial muscle 14. Other embodiments are envisioned where the dimension 32 is measured off the central axis 34 and/or in directions other than the movement direction 22.

As depicted in FIG. 1A, when the artificial muscle drive unit 10 is in a non-actuated state, the dimension 32 is a minimum value $D_{min}$ in the movement direction 22. For example, in the non-actuated state, the fluid 18 may be distributed to the largest lateral extent in a plane perpendicular to the movement direction (e.g., the X-Y plane depicted in FIG. 1A). Such a wide fluid distribution may lead to the dimension 32 possessing the minimum value $D_{min}$. In the depicted embodiment, the artificial muscle 14 is disposed directly on the base 12, such that the dimension 32 measures a maximum distance in the movement direction 22 between a surface of the base 12 and the external surface 20 of the expandable reservoir 16. As depicted in FIG. 1C, when in the actuated state, the dimension 32 is a maximum value $D_{max}$ in the movement direction 22. For example, the distribution of the fluid 18 may be altered (e.g., via providing a potential difference between electrodes to cause contraction of regions of the expandable reservoir 16, causing movement of the fluid 18 and expansion of an expanding region in the movement direction 22) such that the dimension 32 possesses the maximum value $D_{max}$. The actuated state depicted in FIG. 1C may represent a maximum designed expansion of the expandable reservoir 16 in the movement direction 22 (e.g., based on material properties of the expandable reservoir 16, based on a minimum separation distance and lateral extent of electrodes). As depicted in FIG. 1B, when the artificial muscle drive unit 10 is between the non-actuated state depicted in FIG. 1A and the actuated state depicted in FIG. 1C, the dimension 32 is an intermediate value $D_{int}$ that is greater than $D_{min}$ and less than $D_{max}$. In embodiments, the partially activated state depicted in FIG. 1B represents a transient state of the artificial muscle 14 where the fluid is moving to place the artificial muscle 14 in the actuated or non-actuated states. In embodiments, the partially activated state depicted in FIG. 1B represents a static state of the artificial muscle 14 (e.g., the dimension 32 may be fixed at the intermediate value $D_{int}$ for a predetermined time period).

In embodiments, the artificial muscle drive unit 10 is structured such that the expandable reservoir 16 (or at least a portion of the expandable reservoir 16 that moves to transition the artificial muscle 14 between the actuated and non-actuated states described herein) does not encounter external forces when in the non-actuated state. It has been found that external forces may alter a shape of the expandable reservoir 16 or disrupt movement thereof so as to impede re-distribution of the fluid 18 (e.g., in response to additional fluid being pumped into the expandable reservoir 16, in response to the shape of the artificial muscle 14 being manipulated with an external stimulates such as a voltage) in the transition of the artificial muscle 14 to the actuated state. Such impediments caused by external forces may result in the artificial muscle 14 having a reduced force output or displacement.

In view of the foregoing, the artificial muscle drive unit 10 may include one or more load-bearing supports that are positioned so as to prevent the application of external force to the expandable reservoir 16. The structure and arrangement of the one or more load-bearing supports may vary depending on the structure of the artificial muscle drive unit 10, the form of the artificial muscle 14, and the particular force that the artificial muscle 14 is designed to apply to external objects. For example, referring to FIG. 1A, the artificial muscle drive unit 10 includes an actuation platform 28 that is moved relative to the base 12 via the artificial muscle 14. FIG. 1A depicts the actuation platform 28 in a resting orientation. In embodiments, the actuation platform 28 extends perpendicular to the movement direction 22 in the resting orientation to protect the artificial muscle 14 when the object 26 is placed thereon.

In embodiments, the object 26 may be in contact with the actuation platform 28 such that, when the artificial muscle 14 applies a force to the actuation platform 28 (e.g., to move the actuation platform 28 in the movement direction 22), the artificial muscle drive unit 10 applies a force to the object 26 via the actuation platform 28. To prevent the object 26 from placing a load on the artificial muscle 14, the artificial muscle drive unit 10 includes load-bearing supports 24 and 30 disposed between the base 12 and the actuation platform 28. In embodiments, the load-bearing supports 24 and 30 are fixedly attached to the base 12 and the actuation platform 28 moves relative to the load-bearing supports 24 and 30 in response to actuation of the artificial muscle 14. In embodiments, the load-bearing supports 24 and 30 are fixedly attached to the actuation platform 28 such that the load-bearing support 24 and 30 move in conjunction with the actuation platform 28 in response to actuation of the artificial muscle 14.

Referring still to FIG. 1A, the load-bearing supports 24 and 30 include a dimension (e.g., height) in the movement direction 22 that is greater than or equal to the minimum value $D_{min}$ of the dimension 32 of the artificial muscle 14 when in the non-actuated state. In embodiments, the actuation platform 28 rests on the load-bearing supports 24 and 30 such that the actuation platform 28 and the artificial muscle 14 are separated by an offset distance 36 in the movement direction 22 when the artificial muscle 14 is in the non-actuated state. Such separation of the artificial muscle 14 and the actuation platform 28 by the offset distance 36 beneficially prevents the object 26 from placing a load on the artificial muscle 14 in the non-actuated state, avoiding disruptions in re-distribution of the fluid 18 and allowing the artificial muscle 14 to transition from the non-actuated state towards the actuated state in an unimpeded manner. The extent of the offset distance 36 in the movement direction 22 may vary depending on the implementation. For example, in embodiments, the load-bearing supports 24 and 30 are designed to minimize the offset distance 36 (e.g., such that the offset distance 36 is a small, non-zero value that is less than or equal to a difference between $D_{min}$ and $D_{max}$). In such embodiments, it may be beneficial if the load-bearing supports 24 and 30 are constructed of a relatively rigid material (e.g., a metallic material, an alloy, a composite, a plastic) so that the offset distance 36 may be maintained within a suitable tolerance.

In embodiments, the offset distance 36 is greater than or equal to $D_{min}$ to ensure adequate clearance in order to initiate fluid motion within the expandable reservoir 16 to transition the artificial muscle 14 from the non-actuated state. For example, as depicted in FIG. 1B, the expandable reservoir 16 initially contacts the actuation platform 28 when the artificial muscle 14 is in the partially activated state between the non-actuated and actuated states depicted in FIG. 1A and FIG. 1C, respectively. The offset distance 36 (see FIG. 1A) beneficially enables the fluid 18 to re-distribute within the expandable reservoir 16 such that the expandable reservoir 16 partially expands in the movement direction 22 to contact the actuation platform 28. As depicted in FIG. 1C, once the artificial muscle 14 is placed in the fully actuated state, the actuation platform 28 is displaced by the stroking distance $D_s$ in the movement direction 22. As will be appreciated, the magnitude of the stroking distance $D_s$ may vary depending on the design of the artificial muscle 14 and the magnitude of load placed thereon (e.g., due to the mass of the object 26 and/or the actuation platform 28). It has been found that, despite the offset distance 36 created by the load-bearing supports 24 and 30, the artificial muscle 14 can achieve a greater stroking distance $D_s$ with the load-bearing supports 24 and 30 than without the load-bearing supports 24 and 30. That is, if the object 26 imparts a force on the artificial muscle 14 in the non-actuated state, the magnitude of the stroking distance $D_s$, and the force imparted on the object 26 is diminished. The load-bearing supports 24 and 30 thus improve the performance of the artificial muscle 14, holding other factors (e.g., the magnitude of the load imparted by the object 26) constant.

It should be appreciated that the number and positioning of the load-bearing supports in the artificial muscle drive unit 10 may vary depending on the implementation. For example, in embodiments, one or more of the load-bearing supports 24 and 30 may extend through the artificial muscle 14. For example, in embodiments, the expandable reservoir 16 may have an opening extending therethrough (e.g., to define a substantially-ring shaped reservoir with an opening extending through its center) and one or more of the load-bearing supports 24 and 30 may extend through the opening. Such implementation may be beneficial in that the load-bearing supports are disposed very close to the moving portions of the expandable reservoir 16 thereby allowing for tighter tolerance in the dimensions of the load-bearing supports 24 and 30. Embodiments are also envisioned where one or more of the load-bearing supports 24 and 30 are incorporated into the artificial muscle 14. For example, in embodiments, one or more of the load-bearing supports 24 and 30 may be disposed in the expandable reservoir 16, and the expandable reservoir 16 may expand in the movement direction greater than the height of the one or more load-bearing supports 24 and 30.

The artificial muscle drive unit 10 may include any number of load bearing supports (e.g., 1, 2, 3, 4, 5, 6, 7, 8, etc.) depending on the implementation. For example, in embodiments, the artificial muscle drive unit 10 only includes a single load-bearing support (e.g., one of the load-bearing supports 24 and 30 may be omitted). Additionally, the load-bearing supports 24 and 30 may take a variety of different shapes. For example, in embodiments, the load-bearing supports 24 and 30 are integrating into a single component that extends around an entirety of the circumference of the artificial muscle 14. In embodiments, the load-bearing supports 24 and 30 are shaped differently from one another.

In the embodiment depicted in FIGS. 1A, 1B, and 1C, the load-bearing supports 24 and 30 are designed to provide structural support via the actuation platform 28, which extends substantially perpendicular to the movement direction 22 (e.g., in the X-direction depicted in FIGS. 1A, 1B, and 1C). In embodiments, the actuation platform 28 may be omitted and the load-bearing supports 24 and 30 may directly prevent the expandable reservoir 16 from encountering external forces. In embodiments, the actuation platform 28 and the load-bearing supports 24 and 30 are integrated into a single component (e.g., such that the artificial muscle 14 moves the load-bearing supports 24 and 30 and the actuation platform 28 in combination). In embodiments, the load-bearing supports 24 and 30 and the base 12 are integrated into a single component.

Moreover, the directionality of the support provided by the load-bearing supports 24 and 30 may extend in directions other than that depicted in FIGS. 1A, 1B, and 1C. For example, in embodiments, the load-bearing supports 24 and 30 may include different heights such that the actuation platform 28 extends at an angle to the base 12 rather than parallel thereto as depicted. In embodiments, the load-bearing supports 24 and 30 form a load-bearing support surface that extends perpendicular to a particular movement direction 22 of the artificial muscle 14. In embodiments, the load-bearing supports 24 and 30 perform the function described herein with respect to a plurality of the artificial muscles 14 (or a plurality of groupings of artificial muscles) simultaneously.

In embodiments, the load-bearing supports 24 and 30 are removable from the artificial muscle drive unit 10. Such a configuration may beneficially facilitate replacement of the load-bearing supports 24 and 30 to adjust the operating parameters of the artificial muscle drive unit 10. For example, the load-bearing supports 24 and 30 may be removed and replaced with load-bearing supports having different heights depending on the circumstances (e.g., the mass of the object 26). The actuation structures described herein may include a plurality of the artificial muscle drive units 10 in a plurality of different arrangements to achieve a desired actuation chain of the artificial muscles 14. For example, as described herein with respect to FIGS. 9A and 9B, a plurality of the artificial muscle drive units 10 may be stacked on one another in the movement direction 22 such that the displacements generated by the plurality of artificial muscle drive units are combined.

Referring now to FIGS. 2, 3, 4A, and 4B, an example artificial muscle 100 that may be used as the artificial muscle 14 of the artificial muscle drive unit 10 described herein with respect to FIGS. 1A, 1B, and 1C is schematically depicted. The artificial muscle 100 may also be displaced in an artificial muscle stack (e.g., such as the artificial muscle stacks 201, 301, 301' described herein with FIGS. 6A-8) and in a layered actuation structure (e.g., the layered actuation structure 500 described herein with respect to FIGS. 9A-13).

The artificial muscle 100 comprises a housing 110, an electrode pair 104, including a first electrode 106 and a second electrode 108 (see FIG. 4A), fixed to opposite surfaces of the housing 110, a first electrical insulator layer 111 fixed to the first electrode 106, and a second electrical insulator layer 112 fixed to the second electrode 108. In some embodiments, the housing 110 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 110 are heat-sealable. In other embodiments, the housing 110 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

While the embodiments described herein primarily refer to the housing 110 as comprising the first film layer 122 and the second film layer 124, as opposed to the one-piece housing, it should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 100 is negatively charged.

Figure 8:
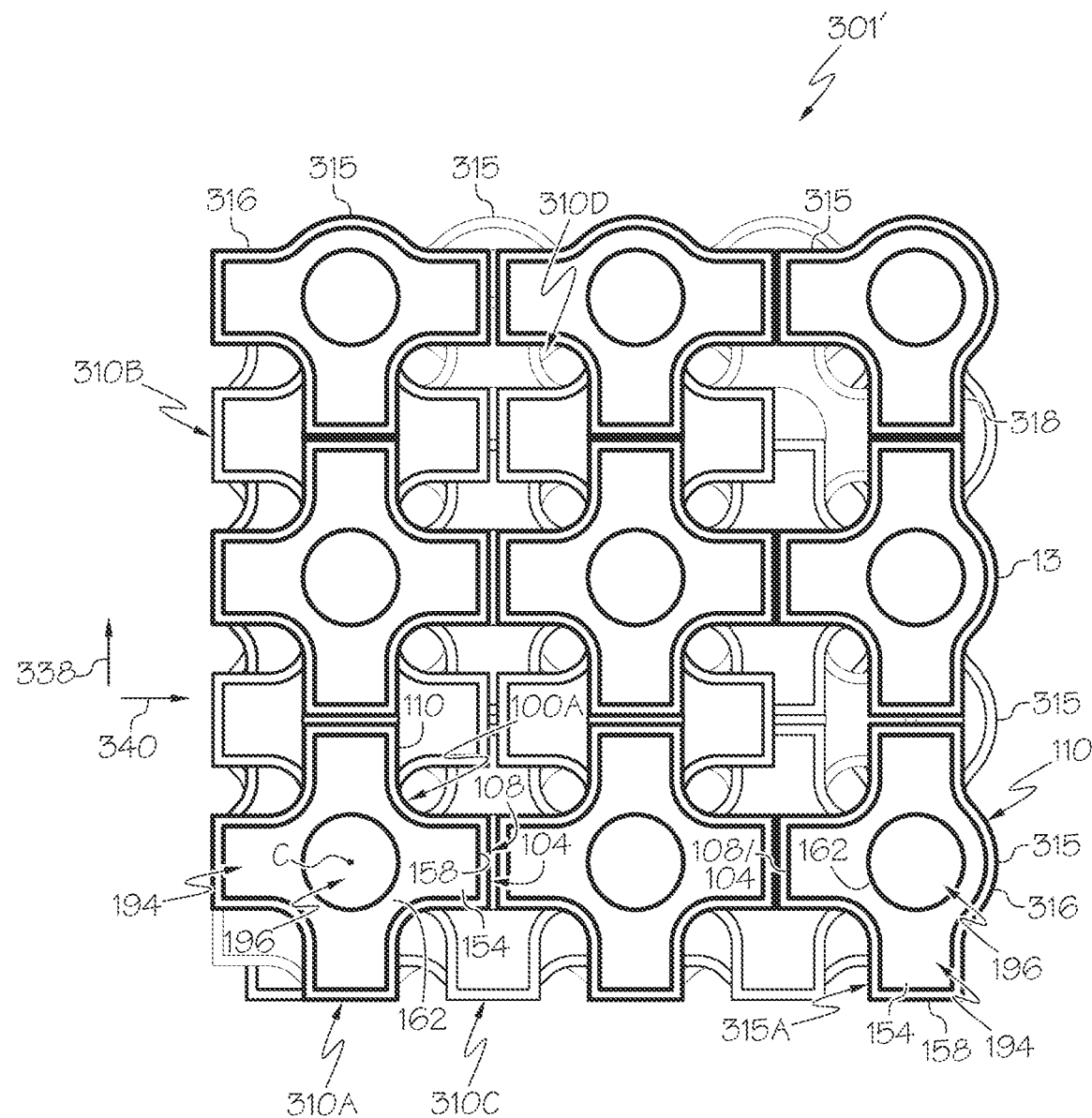
FIG. 8 schematically depicts a top view of an example artificial muscle stack comprising a plurality of artificial muscle layers positioned in alternatingly offset arrangement with the addition of perimeter artificial muscles, according to one or more embodiments shown and described herein.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to a power supply to actuate the first electrode 106. Specifically, the terminal is coupled, either directly or in series, to a power supply and a controller of an actuation system 400, as shown in FIG. 8. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 400 to actuate the second electrode 108.

The first electrode 106 includes two or more tab portions 132 and two or more bridge portions 140. Each bridge portion 140 is positioned between adjacent tab portions 132, interconnecting these adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

Figure 3:
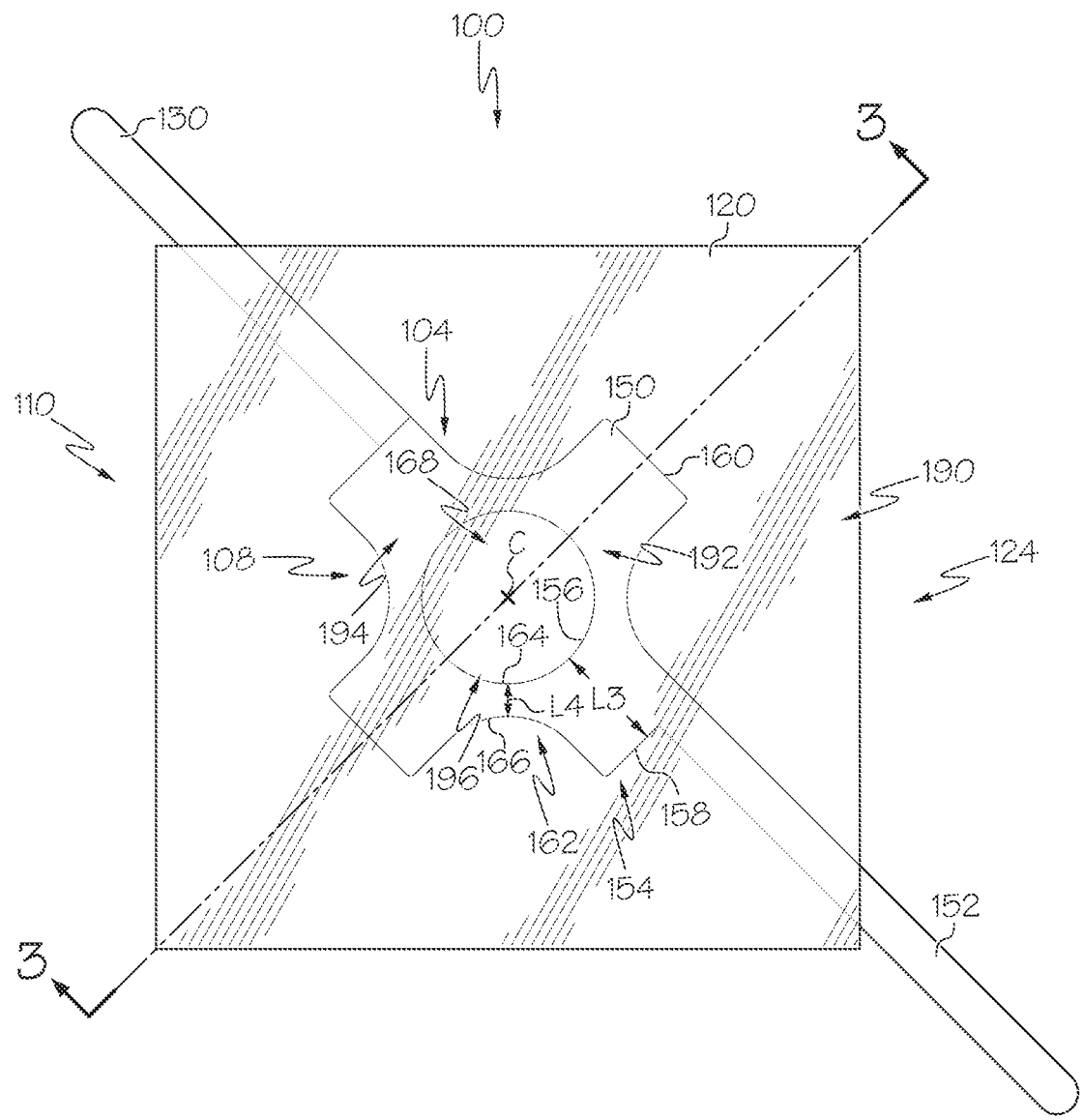
FIG. 3 schematically depicts a top view of the artificial muscle of FIG. 1, according to one or more embodiments shown and described herein.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIGS. 2 and 3, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first terminal 130 extends from the second end 136 of one of the tab portions 132 and is integrally formed therewith.

Like the first electrode 106, the second electrode 108 includes at least a pair of tab portions 154 and two or more bridge portions 162. Each bridge portion 162 is positioned between adjacent tab portions 154, interconnecting these adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 2 and 3, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second terminal 152 extends from the second end 158 of one of the tab portions 154 and is integrally formed therewith.

Figure 4A:
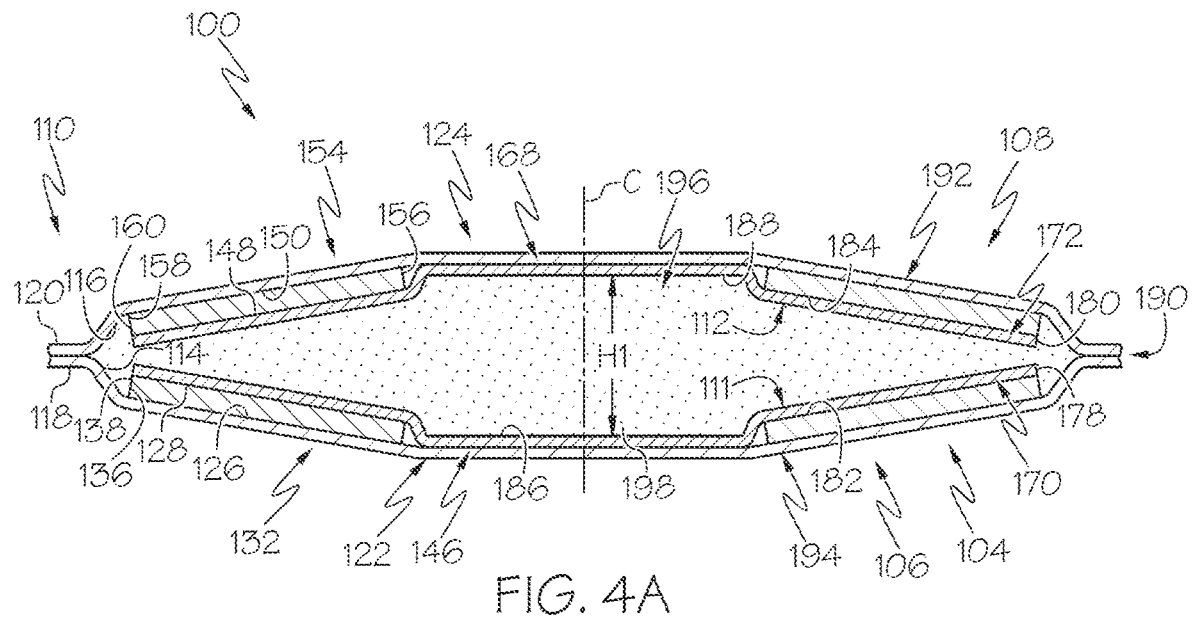
FIG. 4A schematically depicts a cross-sectional view of the artificial muscle of FIGS. 2 and 3 taken along line 3-3 in FIG. 3 in a non-actuated state, according to one or more embodiments shown and described herein.
Figure 4B:
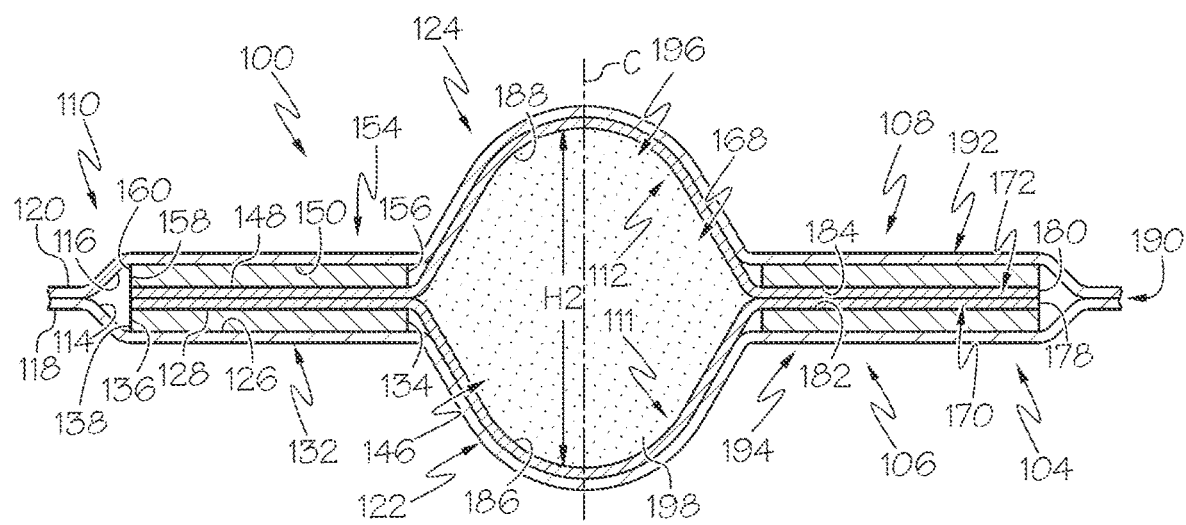
FIG. 4B schematically depicts a cross-sectional view of the artificial muscle of FIG. 2 taken along line 3-3 in FIG. 3 in an actuated state, according to one or more embodiments shown and described herein.
Figure 5A:
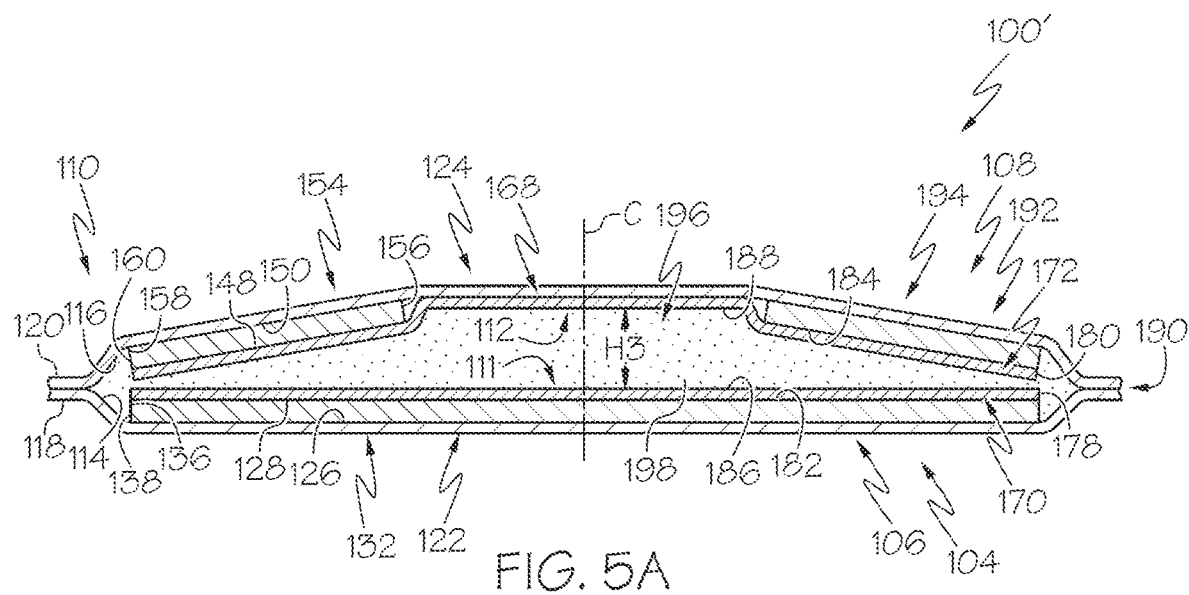
FIG. 5A schematically depicts a cross-sectional view of another illustrative artificial muscle in a non-actuated state, according to one or more embodiments shown and described herein.
Figure 5B:
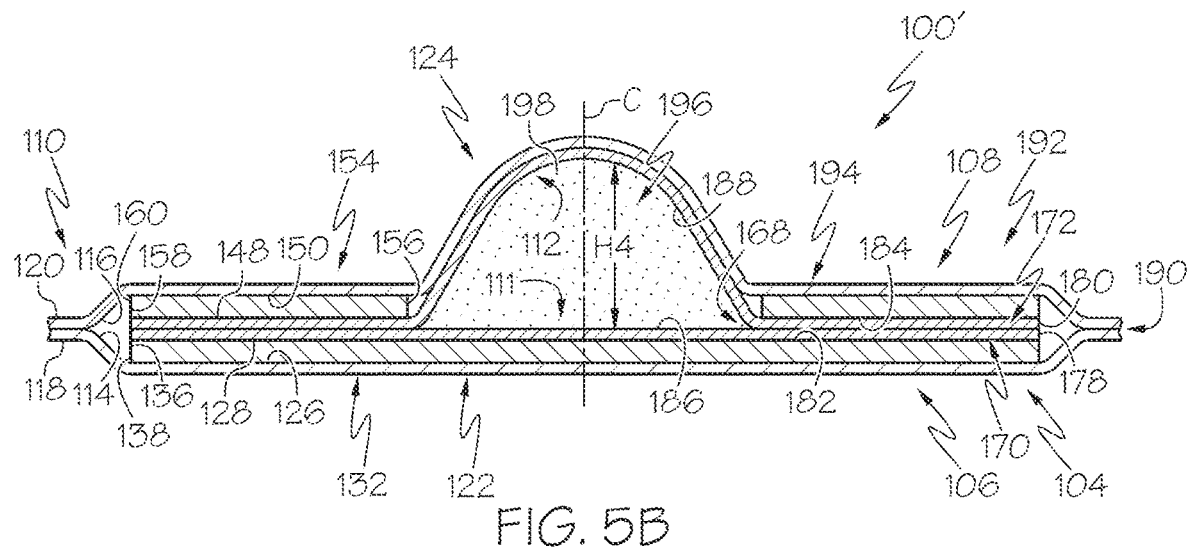
FIG. 5B schematically depicts a cross-sectional view of the artificial muscle of FIG. 5A in an actuated state, according to one or more embodiments shown and described herein.

Referring now FIGS. 2-5B, at least one of the first electrode 106 and the second electrode 108 has a central opening formed therein between the first end 134 of the tab portions 132 and the first end 142 of the bridge portions 140. In FIGS. 4A and 4B, the first electrode 106 has a central opening 146. However, it should be understood that the first electrode 106 does not need to include the central opening 146 when a central opening is provided within the second electrode 108, as shown in FIGS. 5A and 5B. Alternatively, the second electrode 108 does not need to include the central opening when the central opening 146 is provided within the first electrode 106. Referring still to FIGS. 2-5B, the first electrical insulator layer 111 and the second electrical insulator layer 112 have a geometry generally corresponding to the first electrode 106 and the second electrode 108, respectively. Thus, the first electrical insulator layer 111 and the second electrical insulator layer 112 each have tab portions 170, 172 and bridge portions 174, 176 corresponding to like portions on the first electrode 106 and the second electrode 108. Further, the first electrical insulator layer 111 and the second electrical insulator layer 112 each have an outer perimeter 178, 180 corresponding to the outer perimeter 138 of the first electrode 106 and the outer perimeter 160 of the second electrode 108, respectively, when positioned thereon.

It should be appreciated that, in some embodiments, the first electrical insulator layer 111 and the second electrical insulator layer 112 generally include the same structure and composition. As such, in some embodiments, the first electrical insulator layer 111 and the second electrical insulator layer 112 each include an adhesive surface 182, 184 and an opposite non-sealable surface 186, 188, respectively. Thus, in some embodiments, the first electrical insulator layer 111 and the second electrical insulator layer 112 are each a polymer tape adhered to the inner surface 128 of the first electrode 106 and the inner surface 150 of the second electrode 108, respectively.

Referring now to FIGS. 3-5B, the artificial muscle 100 is shown in its assembled form with the first terminal 130 of the first electrode 106 and the second terminal 152 of the second electrode 108 extending past an outer perimeter of the housing 110, i.e., the first film layer 122 and the second film layer 124. As shown in FIG. 3, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 111, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, or the like.

The first electrode 106, the second electrode 108, the first electrical insulator layer 111, and the second electrical insulator layer 112 provide a barrier that prevents the first film layer 122 from sealing to the second film layer 124 forming an unsealed portion 192. The unsealed portion 192 of the housing 110 includes the electrode region 194, in which the electrode pair 104 is provided, and the expandable fluid region 196, which is surrounded by the electrode region 194. The expandable fluid region 196 of the artificial muscle 100 corresponds to the expandable reservoir 16 of the artificial muscle 14 of FIGS. 1A-1C. The central openings 146, 168 of the first electrode 106 and the second electrode 108 form the expandable fluid region 196 and are arranged to be axially stacked on one another. Although not shown, the housing 110 may be cut to conform to the geometry of the electrode pair 104 and reduce the size of the artificial muscle 100, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 100 using a needle or other suitable injection device.

Referring now to FIGS. 4A and 4B, the artificial muscle 100 is actuatable between a non-actuated state and an actuated state. In the non-actuated state, as shown in FIG. 4A, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 110 being sealed at the outer perimeter 138 of the first electrode 106 and the outer perimeter 160 of the second electrode 108. In the actuated state, as shown in FIG. 4B, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196.

Referring now to FIG. 4A, the artificial muscle 100 is shown in the non-actuated state. The electrode pair 104 is provided within the electrode region 194 of the unsealed portion 192 of the housing 110. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. Thus, as shown in FIG. 4A, the first electrode 106 and the second electrode 108 are convex such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 4B, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

Figure 13:
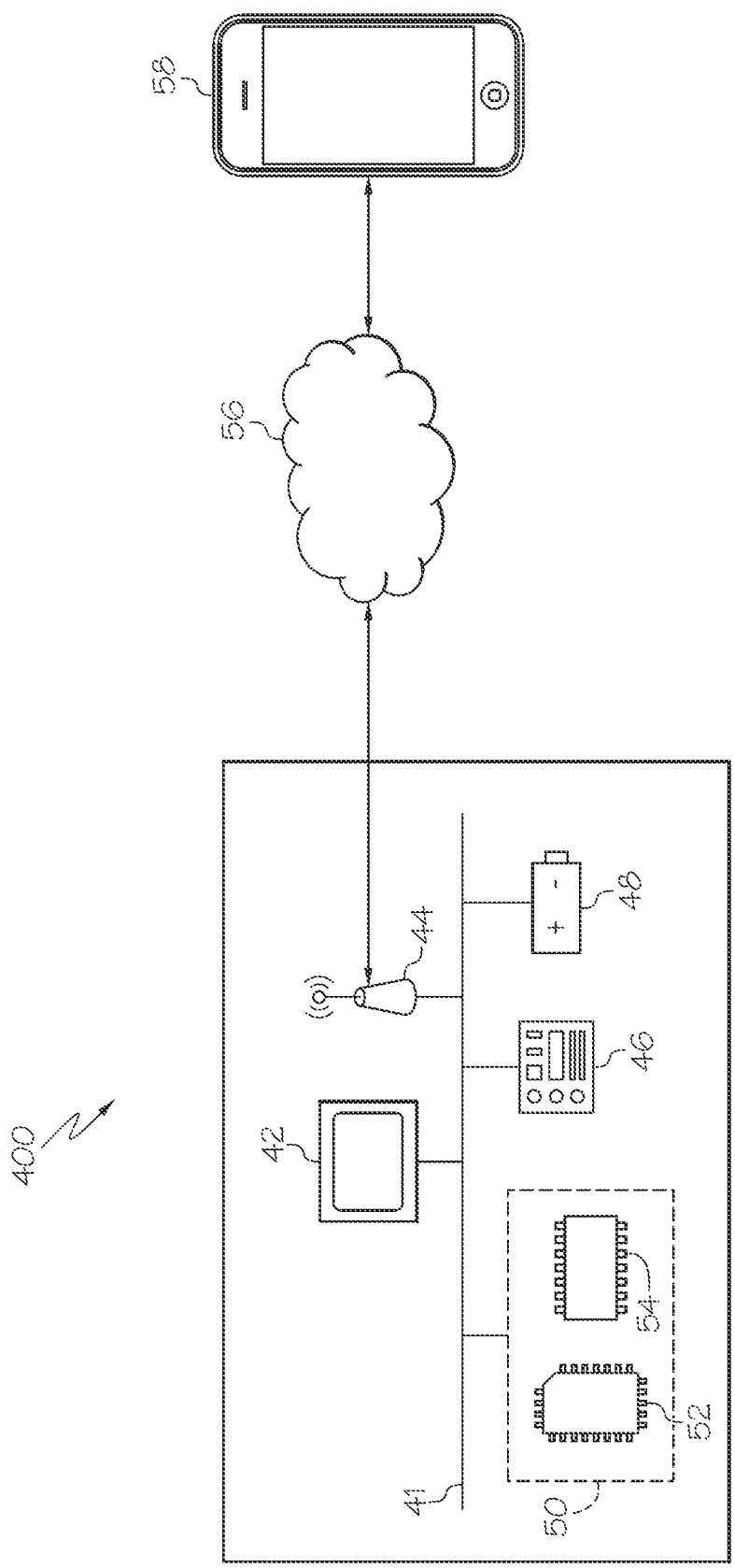
FIG. 13 schematically depicts an actuation system for operating the artificial muscles of the layered actuation structures of FIGS. 9A-11, according to one or more embodiments shown and described herein.

In order to move the first electrode 106 and the second electrode 108 toward one another, a voltage is applied by a power supply (such as power supply 48 of FIG. 13). In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 111 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state. In operation, voltage may be applied to one or multiple artificial muscles 100 of the artificial muscle stacks 201, 301, 301' of FIGS. 6A-8 and the layered actuation structure 500 (FIGS. 9A-11) to collectively and/or selectively actuate the artificial muscles 100 of the artificial muscle stacks 201, 301, 301' and the layered actuation structure 500.

It should be appreciated that the present embodiments of the artificial muscle 100 disclosed herein, specifically, the tab portions 132, 154 with the interconnecting bridge portions 174, 176, provide a number of improvements over actuators that do not include the tab portions 132, 154, such as hydraulically amplified self-healing electrostatic (HASEL) actuators described in the paper titled "*Hydraulically amplified self-healing electrostatic actuators with muscle-like performance*" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). Embodiments of the artificial muscle 100 including two pairs of tab portions 132, 154 on each of the first electrode 106 and the second electrode 108, respectively, reduces the overall mass and thickness of the artificial muscle 100, reduces the amount of voltage required during actuation, and decreases the total volume of the artificial muscle 101 without reducing the amount of resulting force after actuation as compared to known HASEL actuators including donut-shaped electrodes having a uniform, radially-extending width. More particularly, the tab portions 132, 154 of the artificial muscle 100 provide zipping fronts that result in increased actuation power by providing localized and uniform hydraulic actuation of the artificial muscle 100 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing.

In operation, when the artificial muscle 100 is actuated by providing a voltage and applying the voltage to the electrode pair 104 of the artificial muscle 100, expansion of the expandable fluid region 196 produces a force of 3 Newton-millimeters (N·mm) per cubic centimeter ($cm^3$) of actuator volume or greater, such as 4 N·mm per $cm^3$ or greater, 5 N·mm per $cm^3$ or greater, 6 N·mm per $cm^3$ or greater, 7 N·mm per $cm^3$ or greater, 8 N·mm per $cm^3$ or greater, or the like. Providing the voltage may comprise generating the voltage, for example, in an embodiment in which the power supply 48 (FIGS. 9A-13) is a battery, converting the voltage, for example, in an embodiment in which the power supply 48 (FIGS. 9A-13) is a power adaptor, or any other known or yet to be developed technique for readying a voltage for application. In one example, when the artificial muscle 100 is actuated by a voltage of 9.5 kilovolts (kV), the artificial muscle 100 provides a resulting force of 5 N. In another example, when the artificial muscle 100 is actuated by a voltage of 10 kV the artificial muscle 100 provides 440% strain under a 500 gram load.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

As shown in FIGS. 5A and 5B, another embodiment of an artificial muscle 100' is illustrated. The artificial muscle 100' is substantially similar to the artificial muscle 100. As such, like structure is indicated with like reference numerals. However, as shown, the first electrode 106 does not include a central opening. Thus, only the second electrode 108 includes the central opening 168 formed therein. As shown in FIG. 5A, the artificial muscle 100' is in the non-actuated state with the first electrode 106 being planar and the second electrode 108 being convex relative to the first electrode 106. In the non-actuated state, the expandable fluid region 196 has a first height H3. In the actuated state, as shown in FIG. 5B, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 100'. In addition, because the total deformation is formed on only one side of the artificial muscle 100', the second height H4 of the expandable fluid region 196 of the artificial muscle 100' extends further from a longitudinal axis perpendicular to the central axis C of the artificial muscle 100' than the second height H2 of the expandable fluid region 196 of the artificial muscle 100 when all other dimensions, orientations, and volume of dielectric fluid are the same.

Referring now to FIGS. 6A-8, artificial muscle stacks 201, 301, 301' are depicted. In FIGS. 6A-8, each artificial muscle stack 201, 301, 301' comprises a plurality of artificial muscle layers 210, 310 and each of the plurality of artificial muscle layers 210, 310 comprise one of more artificial muscles 100. In some embodiments, the plurality of artificial muscle layers may alternatively or additionally comprise the artificial muscles 100' of FIGS. 5A and 5B). In operation, artificial muscle stacks 201, 301, 301' generate more actuation force than a single artificial muscle 100. FIGS. 6A-8 depict a few different stack arrangements that may be used to generate increased actuation force.

Figure 6A:
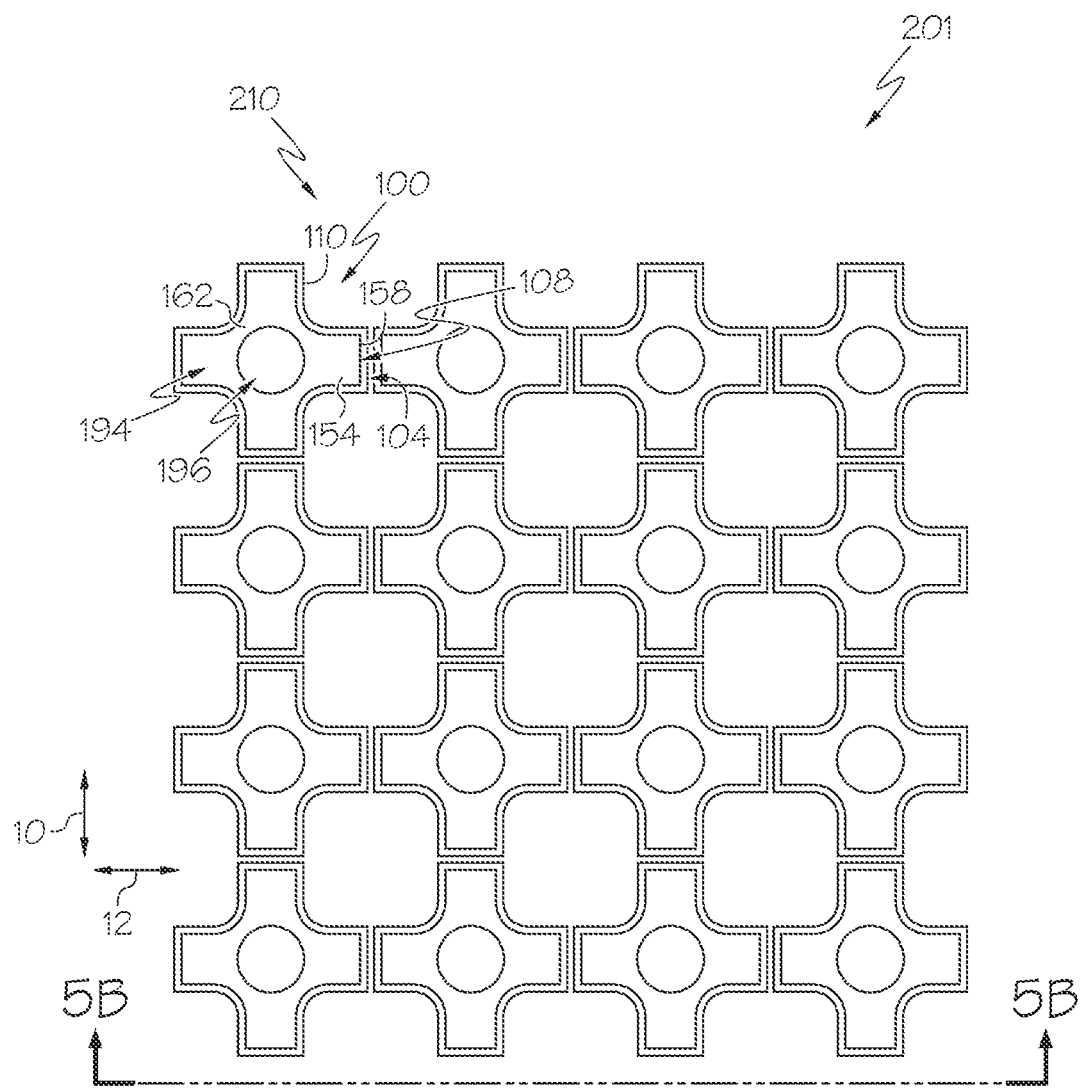
FIG. 6A schematically depicts a top view of an example artificial muscle stack comprising a plurality of artificial muscle layers positioned in a coaxial alignment, according to one or more embodiments shown and described herein.
Figure 6B:
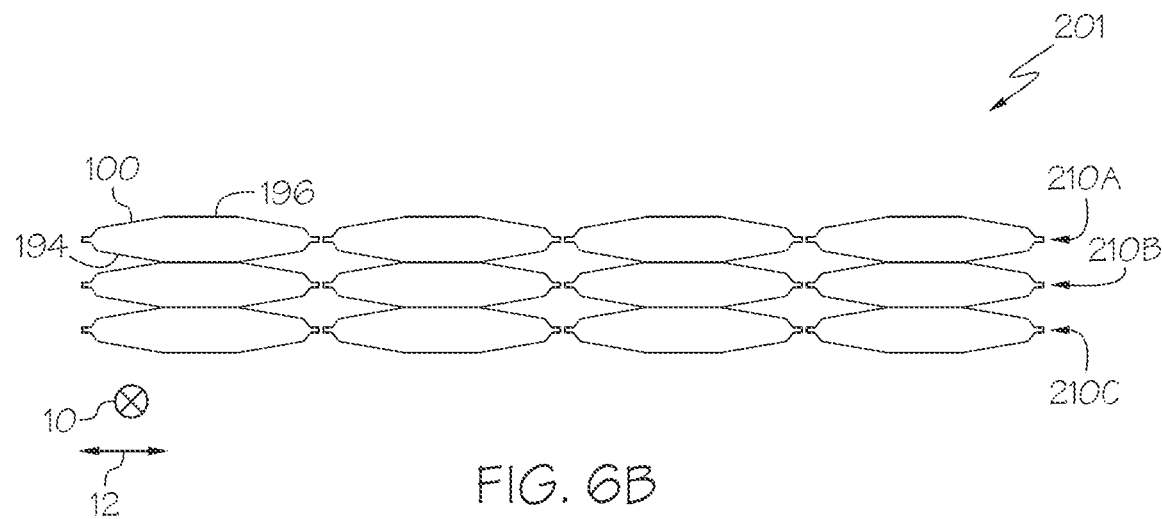
FIG. 6B schematically depicts a side view of the artificial muscle stack of FIG. 6A along line 5B-5B in an unactuated state, according to one or more embodiments shown and described herein.
Figure 6C:
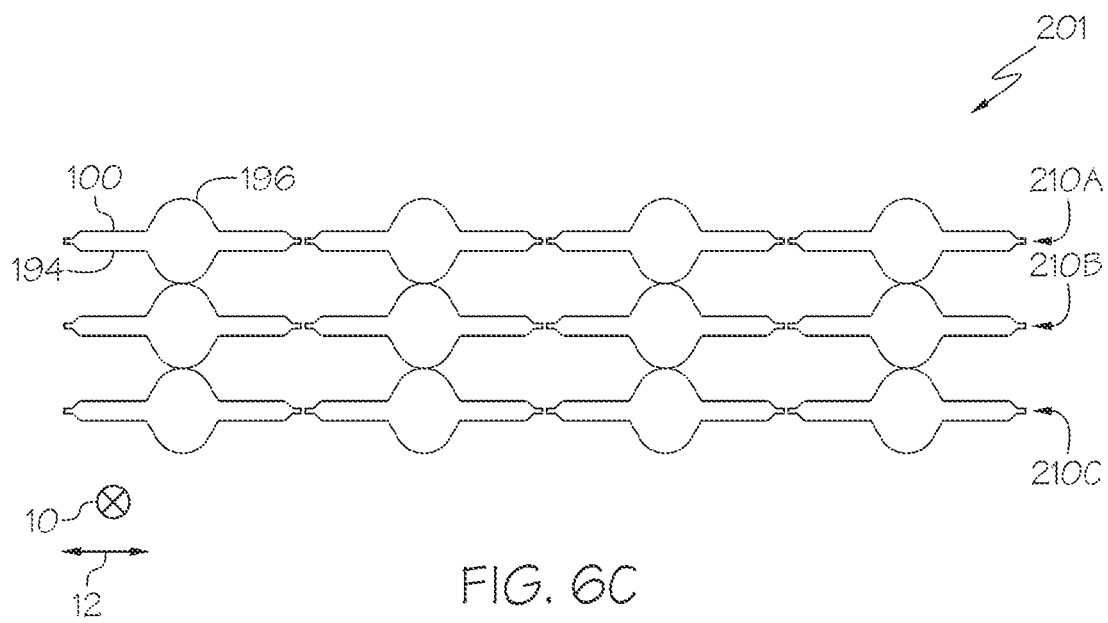
FIG. 6C schematically depicts a side view of the artificial muscle stack of FIG. 5A along line 5B-5B in an actuated state, according to one or more embodiments shown and described herein.

The artificial muscle stack 201 of FIGS. 6A-6C comprises a plurality of artificial muscle layers 210 disposed in coaxial alignment, such that expandable fluid regions 196 of each individual artificial muscle 100 of an individual artificial muscle layer 210 is in coaxial alignment with an individual artificial muscle 100 of each of the other individual artificial muscle layers 210. As shown in the side view of FIGS. 6B and 6C, the artificial muscle stack 201 comprises three artificial muscle layers 210A-210C. It should be understood that any number of artificial muscle layers 210 is contemplated. FIG. 6B depicts the artificial muscle stack 201 in an unactuated state and FIG. 6C depicts the artificial muscle stack 201 in an actuated state. In each layer of the artificial muscle stack 201, individual artificial muscles 100 do not overlap. Further, artificial muscles 100 in adjacent artificial muscle layers 210 may be adhered or sewn together to help stabilize their positioning. Thus, while the artificial muscle stack 201 of FIGS. 6A-6B may generate a collective actuation force, the coaxial alignment of the individual artificial muscles 100 of each artificial muscle layer 210 creates a large footprint. To reduce the footprint of the arrangement of artificial muscles, the artificial muscle stack 301 depicted in FIGS. 7A-7E may be implemented.

Figure 7A:
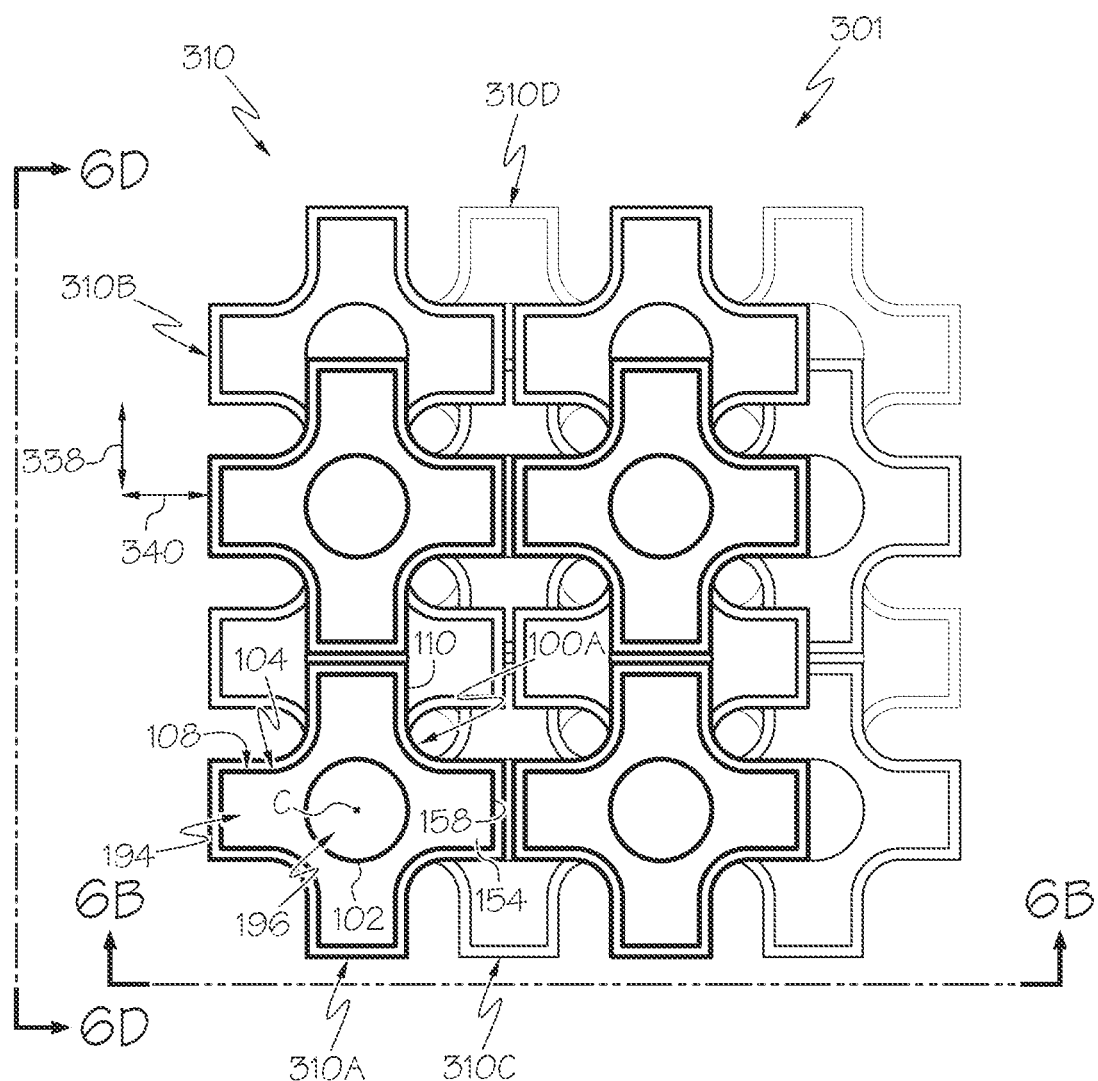
FIG. 7A schematically depicts a top view of an example artificial muscle stack comprising a plurality of artificial muscle layers positioned in alternatingly offset arrangement, according to one or more embodiments shown and described herein.
Figure 7B:
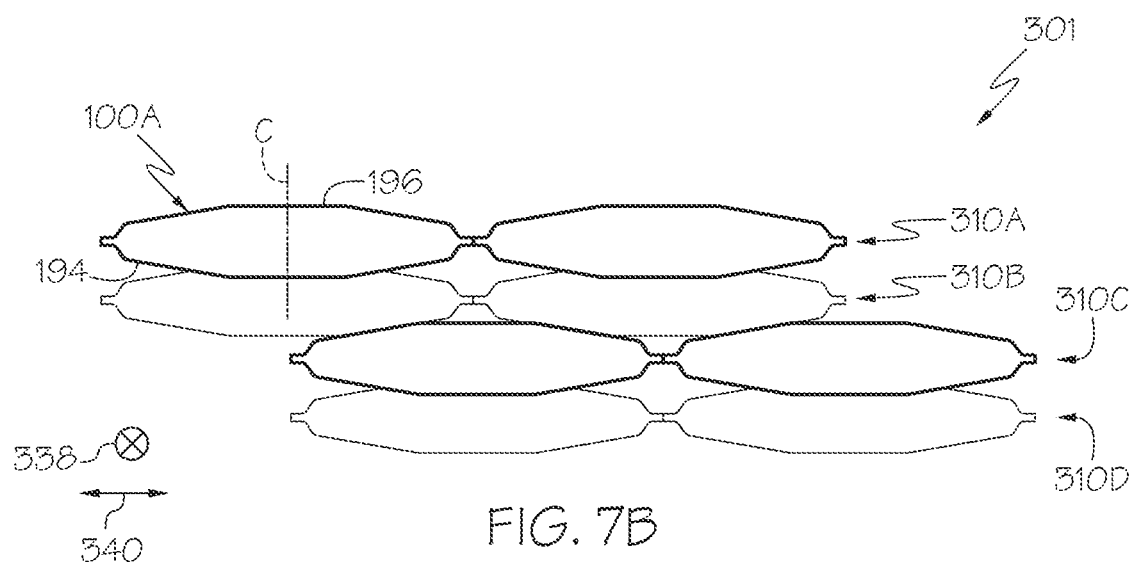
FIG. 7B schematically depicts a side view of the artificial muscle stack of FIG. 7A along line 6B-6B in an unactuated state, according to one or more embodiments shown and described herein.
Figure 7C:
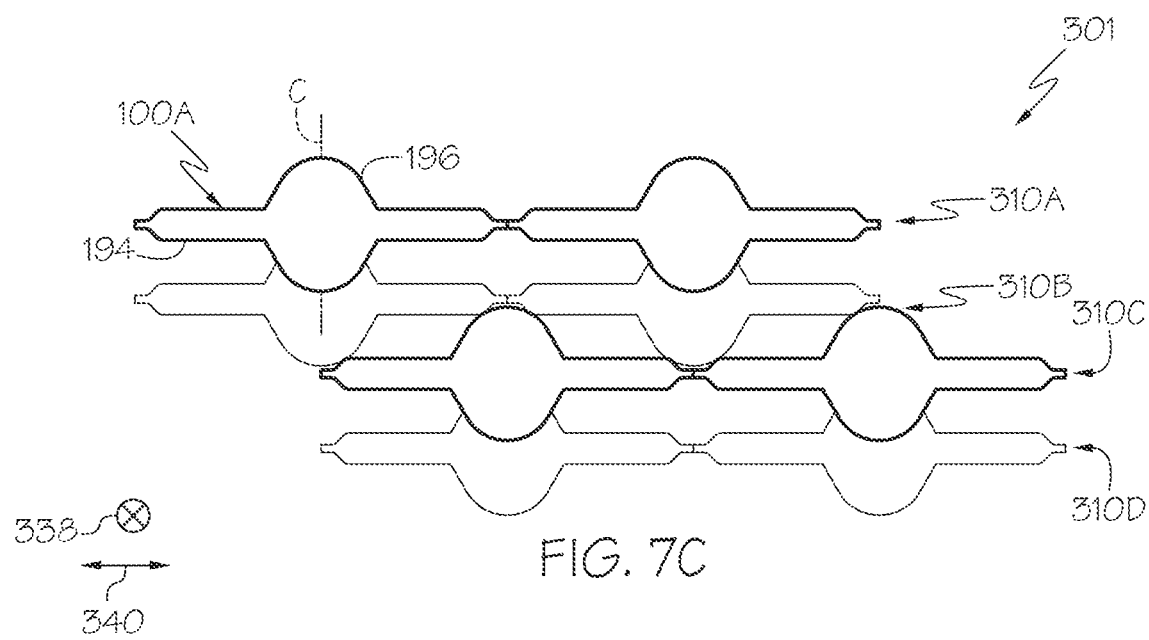
FIG. 7C schematically depicts a side view of the artificial muscle stack of FIG. 7A along line 6B-6B in an actuated state, according to one or more embodiments shown and described herein.
Figure 7D:
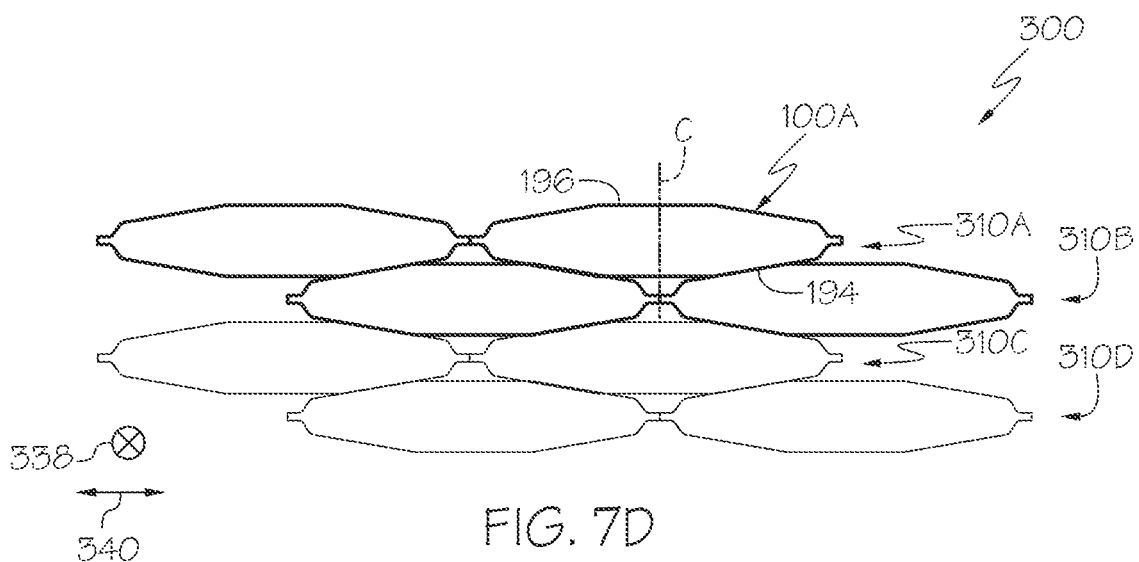
FIG. 7D schematically depicts a side view of the artificial muscle stack of FIG. 7A along line 6D-6D in an unactuated state, according to one or more embodiments shown and described herein.
Figure 7E:
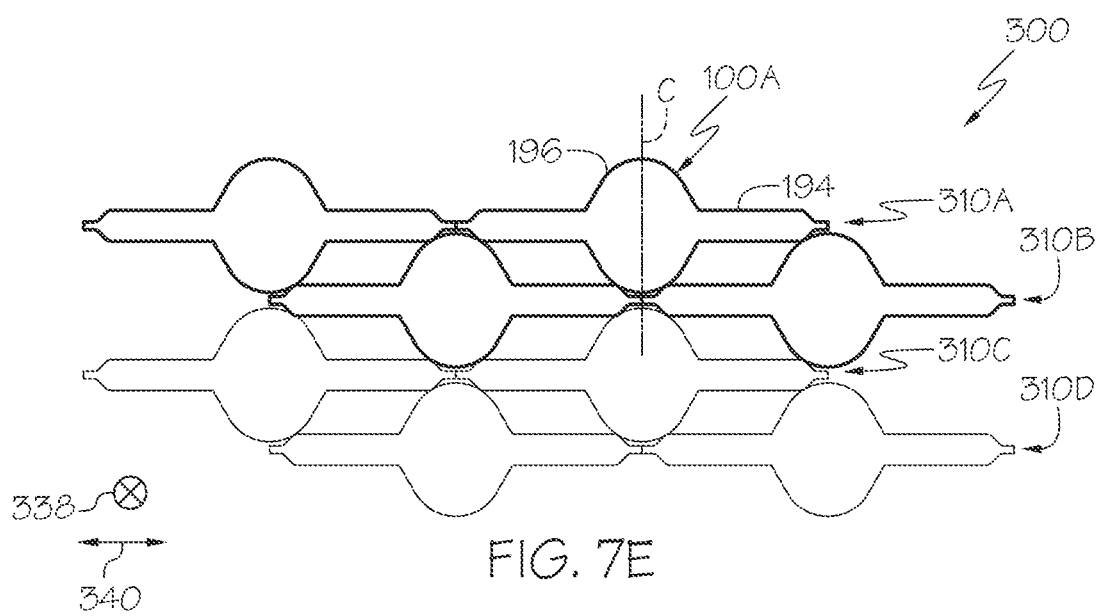
FIG. 7E schematically depicts a side view of the artificial muscle stack of FIG. 7A along line 6D-6D in an actuated state, according to one or more embodiments shown and described herein.

The artificial muscle stack 301 of FIGS. 7A-7E, comprises a plurality of artificial muscle layers 310 arranged in an alternatingly offset arrangement. The artificial muscle stack 301 comprises four artificial muscle layers 310, a first artificial muscle layer 310A, a second artificial muscle layer 310B, a third artificial muscle layer 310C, and a fourth artificial muscle layer 310D. FIG. 7A is a top view of the artificial muscle stack 301 and FIGS. 7B-7E are side views of the artificial muscle stack 301. FIGS. 7B and 7C show a side view of the artificial muscle stack 301 along line 6B-6B in an unactuated state (FIG. 7B) and in an actuated state (FIG. 7C). FIGS. 7D and 7E show a side view of the artificial muscle stack 301 along line 6D-6D in an unactuated state (FIG. 7D) and in an actuated state (FIG. 7E). Line 6B-6B is orthogonal to line 7D-7D and thus FIGS. 7B and 7C show a different side of the artificial muscle stack 301 than FIGS. 7D and 7E and the side shown by FIGS. 7B and 7C is orthogonal to the side shown by FIGS. 7D and 7E.

Each artificial muscle layer 310 comprises one or more artificial muscles 100, for example, a plurality of artificial muscles 100. For example, in FIG. 7A, a first artificial muscle 100A is illustrative of the artificial muscles 100 of the artificial muscle stack 301. It should be understood that embodiments are contemplated in which some of the artificial muscle layers 310 of the artificial muscle stack 301 comprises a single artificial muscle 100. Further, artificial muscles 100 in adjacent artificial muscle layers 310 may be adhered or sewn together to help stabilize their positioning. In the alternating offset arrangement of the artificial muscle stack 301 depicted in FIGS. 7A-7E, the plurality of artificial muscle layers 310 are arranged such that each expandable fluid region 196 of the housing 110 of the one or more artificial muscles 100 of each artificial muscle layer 310 overlaps at least one tab portion 132, 154 of one or more artificial muscles 100 of an adjacent artificial muscle layer 310. In other words, each expandable fluid region 196 of the housing 110 of the one or more artificial muscles 100 of each artificial muscle layer 310 overlaps the electrode region 194 of the housing 110 of one or more artificial muscles 100 of an adjacent artificial muscle layer 310. In some embodiments, an individual tab portion 132, 154 of one artificial muscle 100 may overlap the expandable fluid region 196 of an artificial muscle 100 in an adjacent artificial muscle layer 310 such that the second end 136, 158 of the individual tab portion 132, 154 terminates at or near the center axis C of the expandable fluid region 196 of the artificial muscle 100 in the adjacent muscle layer 310. Thus, some of the expandable fluid regions 196 may be overlapped by two tab portions 132, 154, each from a different artificial muscle 100, on one or both sides of the expandable fluid region 196. The tab portions 154 of the second electrode 108 of the electrode pair 104 are shown in FIG. 7A but it should be understood that the electrode pair 104 also includes the first electrode 106 with tab portions 132.

To illustrate the alternatingly offset arrangement of the artificial muscle stack 301 in FIGS. 7A-7E, relative line thickness of the artificial muscles 100 of each artificial muscle layer 310 is used to illustrate a relative spatial positioning of the respective artificial muscle layers 310. For example, in FIG. 7A, the first artificial muscle layer 310A is the top layer, so the artificial muscles 100 of the first artificial muscle layer 310A are depicted with the widest line thickness of the plurality of artificial muscle layers 310. Similarly, in FIG. 7A, the fourth artificial muscle layer 310D is the bottom layer, so the artificial muscles 100 of the fourth artificial muscle layer 310D are depicted with the narrowest line thickness of the plurality artificial muscle layers 310.

In the alternatingly offset arrangement of the artificial muscle stack 301, adjacent artificial muscle layers 310 of the artificial muscle stack 301 are offset from one another along one or more tab axes, such as a first tab axis 338 or a second tab axis 340. Each tab axis extends from a center axis C of the expandable fluid region 196 of an individual artificial muscle 100 of the plurality of artificial muscle layers 310 to an end (i.e., the second end 136, 158) of at least one of the tab portions 132, 154 of the individual artificial muscle 100 of the plurality of artificial muscle layers 310. As the embodiments of the artificial muscles 100 of the artificial muscle stack 301 depicted in FIGS. 7A-7E each comprise four tab portions 132, 154 arranged in diametrically opposed pairs, the first tab axis 338 is orthogonal the second tab axis 340. While the artificial muscles 100 of the artificial muscle stack 301 comprise four tab portions 132, 154 (i.e., each electrode of the electrode pair 104 of each artificial muscles 100 comprises four tab portions 132, 154), it should be understood that embodiments are contemplated with artificial muscles 100 comprising more or less than four tab portions 132, 154. These embodiments may comprise more than two tab axis, such as in an embodiment with three tab portions per electrode, five tab portions per electrode, or six tab portions per electrode, or just a single tab axis, such as embodiments comprising a single pair of diametrically opposed tab portions. Moreover, it should be understood that embodiments are contemplated in which other artificial muscle designs are arranged in an alternatingly offset arrangement, for example, triangular or rectangular artificial muscles.

Referring still to FIGS. 7A-7E, embodiments of the artificial muscle stack 301 comprising at least three artificial muscle layers 310 include at least one inner artificial muscle layer, which is an artificial muscle layer 310 adjacent two other artificial muscle layers 310. In these embodiments, each inner artificial muscle layer is offset a first adjacent artificial muscle layer along a first tab axis 338 and offset a second adjacent artificial muscle layer along a second tab axis 340. This multi-axis offset is depicted in the side views of FIGS. 7B-7E by a lateral shift, which shows offset along one tab axis, and by a relative line thickness, which shows offset along the other tab axis. In FIGS. 7B and 7C, offsets between artificial muscle layers 310 along the second tab axis 340 are shown by a lateral shift and offsets between adjacent artificial muscle layers 310 along the first tab axis 338 are shown by a relative line thickness. In particular, a wider line thickness in FIGS. 7B and 7C denotes artificial muscle layers 310 shifted along the first tab axis 338 into the foreground (i.e., out of the page) and a narrower line thickness in FIGS. 7B and 7C denotes artificial muscle layers 310 shifted along the first tab axis 338 into the background (i.e., into the page). In FIGS. 7D and 7E, offsets between artificial muscle layers 310 along the first tab axis 338 are shown by a lateral shift and offsets between adjacent artificial muscle layers 310 along the second tab axis 340 are shown by a relative line thickness. In particular, a wider line thickness in FIGS. 7D and 7E denotes artificial muscle layers 310 shifted along the second tab axis 340 into the foreground (i.e., out of the page) and a narrower line thickness in FIGS. 6D and 6E denotes artificial muscle layers 310 shifted along the second tab axis 340 into the background (i.e., into the page).

In FIGS. 7A-7E, the second artificial muscle layer 310B and the third artificial muscle layer 310C are inner artificial muscle layers. The second artificial muscle layer 310B is offset from the first artificial muscle layer 310A along the first tab axis 338 and offset from the third artificial muscle layer 310C along the second tab axis 340. The third artificial muscle layer 310C is offset from the second artificial muscle layer 310B along the second tab axis 340 and offset from the fourth artificial muscle layer 310D along the first tab axis 338. In artificial muscle stacks 301 with increased numbers of artificial muscle layers 310, this pattern may repeat allowing for a closely packed stacked arrangement of artificial muscle layers.

Referring still to FIGS. 7A-7E, the overlap between the tab portions 132, 154 and expandable fluid regions 196 in adjacent artificial muscle layers 310 in the alternatingly offset arrangement of the artificial muscle stack 301 allows an increased number artificial muscles 100 to be disposed within a particular footprint when compared to the artificial muscle stack 201 of FIGS. 5A-5C. Indeed, the artificial muscle stack 301 maximizes the number of artificial muscles 100 that may be disposed in a particular footprint, in both a lateral direction (i.e., along the first and second tab axes 338, 340) and in a depth direction, maximizing the collective actuation force per unit volume of the artificial muscle stack 301. When each artificial muscle 100 actuates, the tab portions 132, 154 of the electrode pair 104 close together (e.g., flatten) and the expandable fluid region expands 196. Because the tab portions 132, 154 flatten, expandable fluid regions 196 of artificial muscles 100 may be positioned above and/or below tab portions of adjacent artificial muscle layers 310. This allows an increased number of artificial muscles to be positioned together in a condensed block (i.e., the artificial muscle stack 301) and operate cooperatively. Indeed, the artificial muscle stack 301 is designed such that the artificial muscles 100 of each artificial muscle layer 310 are able to express their collective force in an additive manner. In contrast, the coaxial alignment of the artificial muscle stack 201 of FIG. 6A limits the additive force generated by each artificial muscle layer 210 because the expandable fluid regions 196 of each artificial muscle layer 210 overlap.

Referring now to FIG. 8, the artificial muscle stack 301' is depicted. The artificial muscle stack 301' comprises the artificial muscle stack 301 of FIGS. 7A-7E with the addition of perimeter artificial muscles 315. The perimeter artificial muscles 315 comprise the same structure as the artificial muscles 100 but have fewer tab portions 132, 154 than the artificial muscles 100 of the artificial muscle stack 301', as shown by first perimeter artificial muscles 315A. As shown in FIG. 8, the artificial muscles 100 of the artificial muscle stack 301' comprise four tab portions 132, 154 and the perimeter artificial muscles 315 comprise either two or three tab portions 132, 154. In particular, the perimeter artificial muscles 315 may comprise edge perimeter artificial muscles 316 and corner perimeter artificial muscles 318. The edge perimeter artificial muscles 316 extend along a single side of the artificial muscle stack 301 and the corner perimeter artificial muscles 318 are disposed at a corner of the artificial muscle stack 301 such that one tab portion of the corner perimeter artificial muscles 318 extends along one side of the artificial muscle stack 301 and another tab of the corner perimeter artificial muscle 318 extend along another side of the artificial muscle stack 301.

As shown in FIGS. 7A-7E, the alternating offset arrangement of the plurality of artificial muscle layers 310 of the artificial muscle stack 301 creates a symmetry imbalance along the edges of the artificial muscle stack 301. That is, due to the alternating offset arrangement, the artificial muscle layers 310 may laterally terminate at different locations, leaving edge gaps in the artificial muscle stack 301. As shown in FIG. 8, the perimeter artificial muscles 315 may be used to fill these edge gaps such that each artificial muscle layer 310 of the artificial muscle stack 301' are laterally coterminous. In some embodiments, each artificial muscle layer 310 may comprise perimeter artificial muscles 315, for example, a combination of edge perimeter artificial muscles 316 and corner perimeter artificial muscle 318 to both balance the symmetric along the edges of the artificial muscles stack 301 and add additional actuation force to the artificial muscle stack 301 without increasing the overall footprint.

Figure 9A:
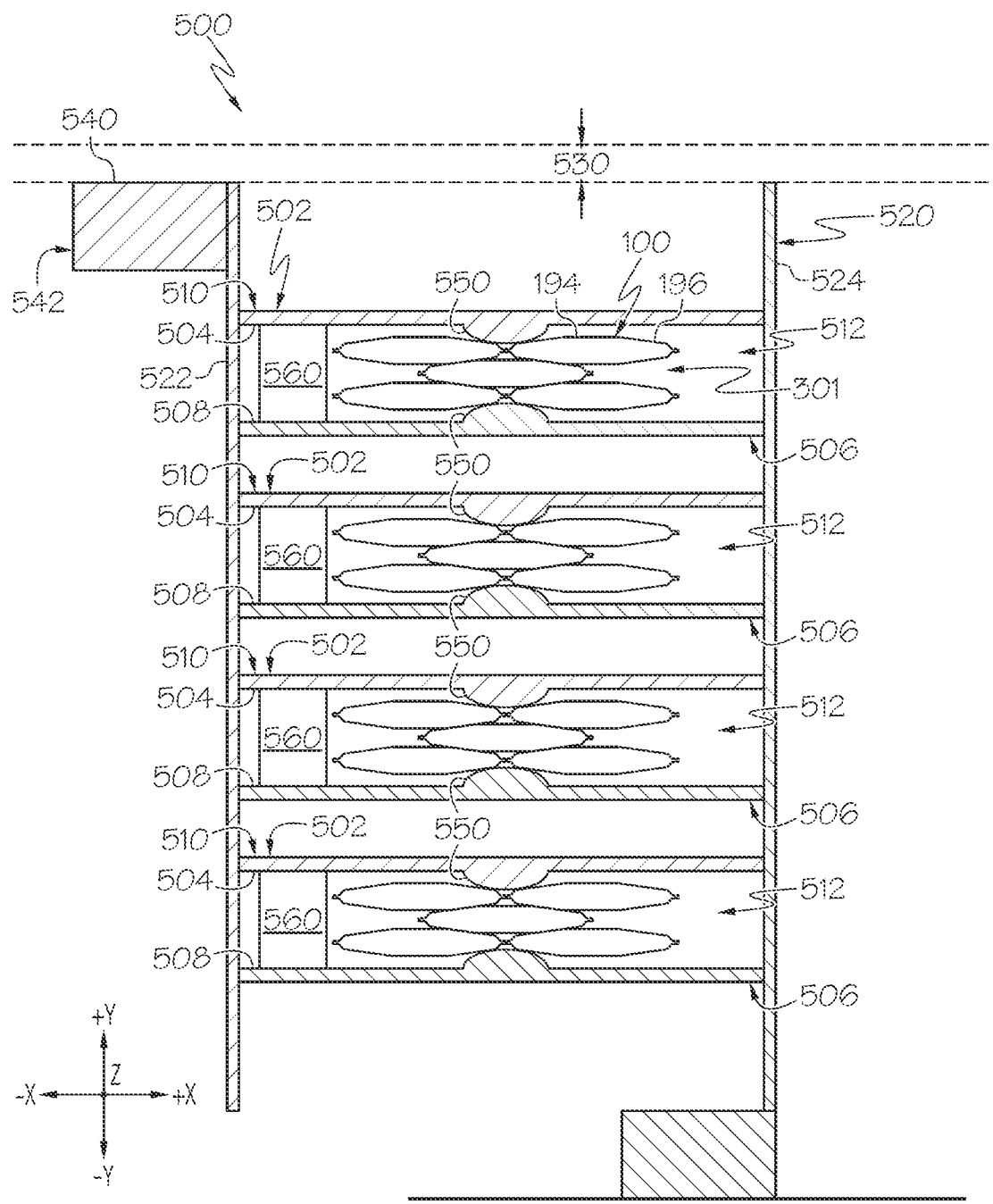
FIG. 9A schematically depicts a cross section of layered actuation structure comprising artificial muscles in a non-actuated state, according to one or more embodiments shown and described herein.
Figure 9B:
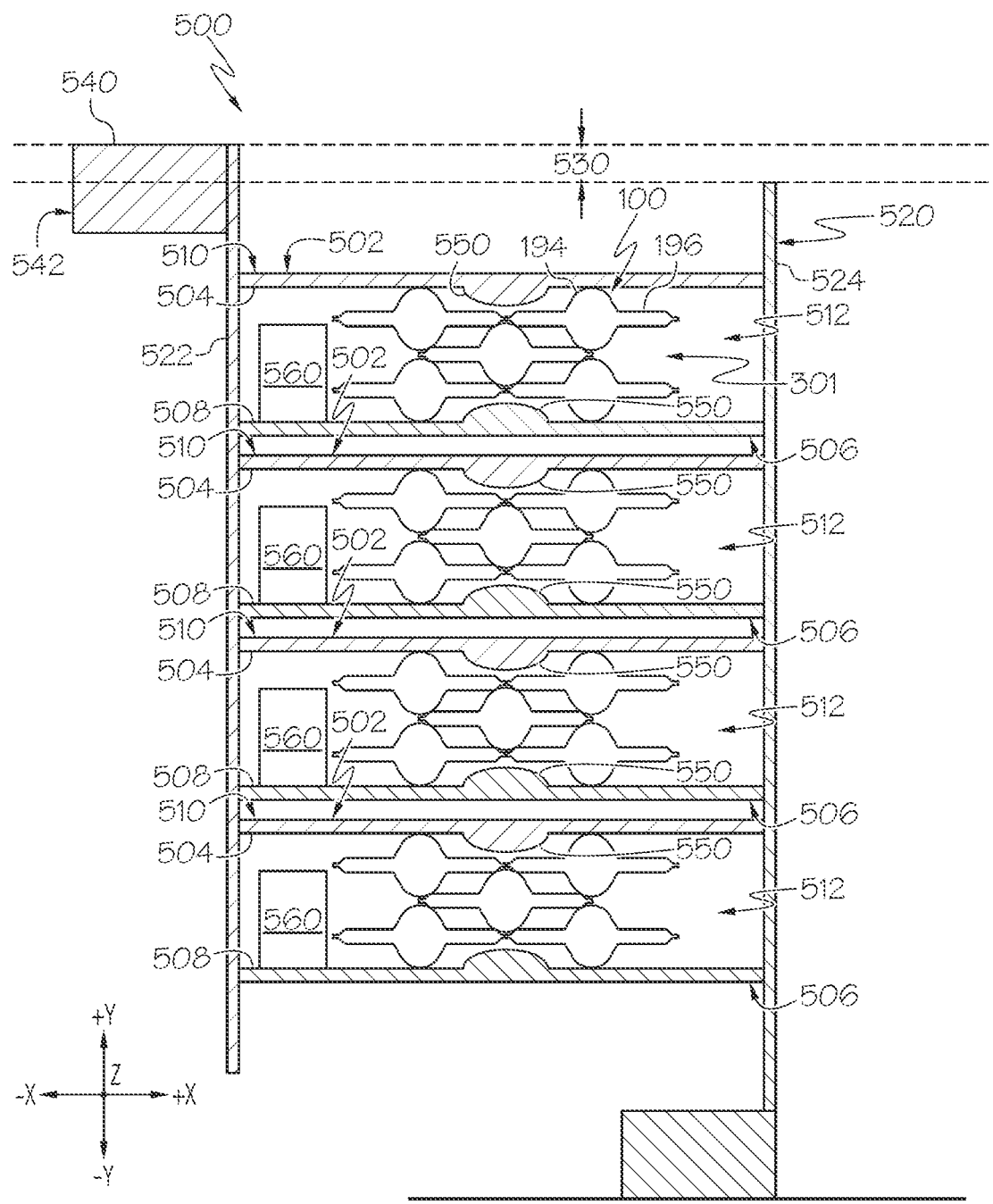
FIG. 9B schematically depicted the layered actuation structure of FIG. 9A in which the artificial muscles are in an actuated state, according to one or more embodiments shown and described herein.

Referring now to FIGS. 9A and 9B, the layered actuation structure 500 is schematically depicted. FIG. 9A schematically depicts the layered actuation structure 500 in a non-actuated state. FIG. 9B schematically depicts the layered actuation structure 500 in an actuated state. The layered actuation structure 500 includes one or more actuation platforms 502 interleaved with one or more mounting platforms 506 to form one or more platform pairs 510. Each platform pair 510 includes a mounting platform 506 and actuation platform 502 forming an actuation cavity 512 therebetween. The one or more actuation platforms 502 each comprise a cavity-facing surface 504. Similarly, the one or more mounting platforms 506 each comprise a cavity-facing surface 508. In each platform pair 510, the cavity-facing surface 504 of the individual actuation platform 502 faces the cavity-facing surface 508 of the individual mounting platform 506. In some embodiments, the actuation platforms 502 and the mounting platforms 506 each comprise a thickness of from ¼ inch to 1/32 inch, for example, ¼ inch, ⅛ inch, 1/10 inch, 1/12 inch, 1/16 inch, 1/20 inch, 1/24 inch, 1/28 inch, 1/32 inch, or any range having any two of these values as endpoints.

Referring still to FIGS. 9A and 9B, each of the platform pairs 510 is spaced from at least one adjacent one of the platform pairs 510 by at least a cavity displacement distance 530 to provide clearance for the one or more actuation platforms 502 to move relative to the one or more mounting platforms 506 in a movement direction (e.g., the Y-direction depicted in FIGS. 9A and 9B). Moreover, one or more artificial muscles 100 are disposed in each of the actuation cavities 512 such that actuation of the one or more artificial muscles 100, that is, expansion of the expandable fluid region 196 applies pressure to the one or more actuation platforms 502, generating translational motion of the one or more actuation platforms 502. While the artificial muscles 100 are depicted in FIGS. 9A and 9B, it should be understood that the layered actuation structure 500 may include any embodiment of an artificial muscle described herein. In some embodiments, a single artificial muscle 100 is disposed in some or all of the actuation cavities 512. In other embodiments, a plurality of artificial muscles 100 are disposed in some or all of the actuation cavities 512. Moreover, when a plurality of artificial muscles 100 are disposed in an actuation cavity, the plurality of artificial muscles 100 are disposed in an artificial muscle stack 301 comprising a plurality of artificial muscles layers arranged in an alternating offset arrangement, as described above with respect to FIGS. 7A-8.

Referring to FIGS. 9A and 9B, the actuation structure 500 includes one or more load-bearing supports 560. In the depicted embodiment, the actuation structure 500 includes a plurality of load-bearing supports 560, with one or more of the plurality of load-bearing supports 560 being disposed in one of the actuation cavities 512. In embodiments, the plurality of load-bearing supports 560 define a minimum separation distance between each pair of cavity-facing surfaces 504 and 508 defining each of the actuation cavities 512. The minimum separation distance may extend in a movement direction in which the plurality of artificial muscles 100 are designed to expand and move an actuation surface 540. In embodiments, the actuation surface 540 may encounter loads from external sources (e.g., an object may be placed on the actuation surface 540). The load-bearing supports 560 beneficially prevent the actuation platforms 502 from compressing the artificial muscles 100 of the actuation structure 500 when the artificial muscles 100 are in the non-actuated state.

In embodiments, the height of one of the load-bearing supports 560 (e.g., in the Y-direction depicted in FIGS. 9A and 9B) is determined based on a height of the artificial muscle structure disposed in the actuation cavity 512 of the load-bearing support 560. In embodiments, the heights of the plurality of load-bearing supports 560 are at least as great as the heights as the artificial muscle structures disposed in the actuation cavities 512 containing the plurality of load-bearing supports (e.g., a combined height when the plurality of artificial muscles 100 are stacked in the movement direction). In embodiments where the actuation cavities 512 include differing numbers and arrangements of the artificial muscles 100 described therein, for example, the heights of the plurality of load-bearing supports 560 may vary throughout the actuation structure 500. To illustrate, if a first one of the actuation cavities 512 includes a single one of the artificial muscles 100, the height of the load-bearing support 560 disposed therein may be less than that disposed in another one of the actuation cavities 512 having the artificial muscle stack 301' disposed therein. Embodiments are also envisioned where the plurality of load-bearing supports 560 comprise the same structure (e.g., height) irrespective of the structure of artificial muscles disposed in each of the actuation cavities.

Referring to FIG. 9A, when the plurality of artificial muscles 100 are in the non-actuated state described herein, the plurality of load-bearing supports 560 maintain a clearance between the cavity-facing surfaces 504 and 508 and the external surfaces of the plurality of artificial muscles 100. As described herein, such clearance facilitates movement of fluid within each of the plurality of artificial muscles 100 to facilitate a transition from the non-actuated state to a partially activated state and then to an actuated state. In embodiments, such clearance facilitates the plurality of artificial muscles 100 having greater expansion capacities when the actuation structure 500 encounters an external load (e.g., if an object is placed on the actuation surface 540) over embodiments not including the plurality of load-bearing supports 560.

Referring to FIG. 9B, when the plurality of artificial muscles 100 are in the actuated state described herein, external surfaces of the plurality of artificial muscles 100 contact the cavity-facing surfaces 504 and 508 and apply a force thereto in the movement direction. In embodiments, the plurality of mounting platforms 506 are fixed (e.g., via a support arm 524 being coupled to a base) and the plurality of actuation platforms 502 are movable in the movement direction (e.g., via coupling to an actuation arm 522 that is movable relative to the base), such that the force from the plurality of artificial muscles 100 lifts each actuation platform 502 above each of the plurality of load-bearing supports 560 by the cavity displacement distance 530 in the movement direction.

Referring still to FIGS. 9A and 9B, in embodiments, the plurality of load-bearing supports 560 are disposed within each of the actuation cavities 512 (e.g., between the support arm 524 and the actuation arm 522). In embodiments, the plurality of load-bearing supports 560 are disposed outside of the plurality of artificial muscles 100 (e.g., the plurality of load-bearing supports 560 do not overlap the plurality of artificial muscles 100 in the movement directions). In embodiments, the plurality of load-bearing supports 560 are disposed in a peripheral region of each of the actuation cavities 512, and the plurality of artificial muscles 100 are disposed in a central region of each of the actuation cavities 512.

In embodiments, the plurality of load-bearing supports 560 are disposed outside of the actuation cavities 512. For example, as described herein with respect to FIG. 11, in embodiments, the mounting platforms 506 and actuation platforms 502 may include extension tabs (such as extension tabs 570 depicted in FIG. 11) that extend peripherally outward from the actuation cavities 512 in a direction perpendicular to the movement direction (e.g., in the X-direction depicted in FIG. 9B), and the plurality of load-bearing supports 560 may extend between the extension tabs. Such implementations may facilitate compactness of the actuation structure 500 by limiting the lateral extent of main bodies of the actuation platforms 502 and mounting platforms 506 to the sizes of the artificial muscle arrangements disposed therein. Embodiments are also envisioned where the plurality of load-bearing supports 560 extend through the arrangement of artificial muscles 100 disposed in one or more the actuation cavities 512 or the plurality of load-bearing supports 560 are integrated into the structure of the plurality of artificial muscles 100.

Referring still to FIGS. 9A and 9B, the one or more actuation platforms 502 and the one or more mounting platforms 506 each comprise one or more bumps 550 extending into the one or more actuation cavities 512. In particular, the bumps 550 extend outward from the cavity-facing surface 504 of the actuation platforms 502 and the cavity-facing surface 508 of the mounting platforms 506. The one or more bumps 550 are sized and positioned to overlap with the electrode region 194 of at least one of the one or more artificial muscles 100 arranged in the actuation cavities 512. In operation, when the expandable fluid regions 196 of the artificial muscles 100 expand and press against the cavity-facing surfaces 504, 508 of the actuation platform 502 and the mounting platform 506, the contracted electrode regions 194 press against the bump 550. In some embodiments, the bumps 550 are arranged to correspond with the alternating offset arrangement of the artificial muscle stack 301. That is, the one or more bumps 550 are positioned such that an individual bump 550 aligns with at least one tab portion 132 which is positioned in the electrode region 194 of at least one artificial muscle 100. In some embodiments the plurality of load-bearing supports 560 may also maintain a clearance between the one or more bumps 550 and the external surface of the plurality of artificial muscles 100.

Figure 10:
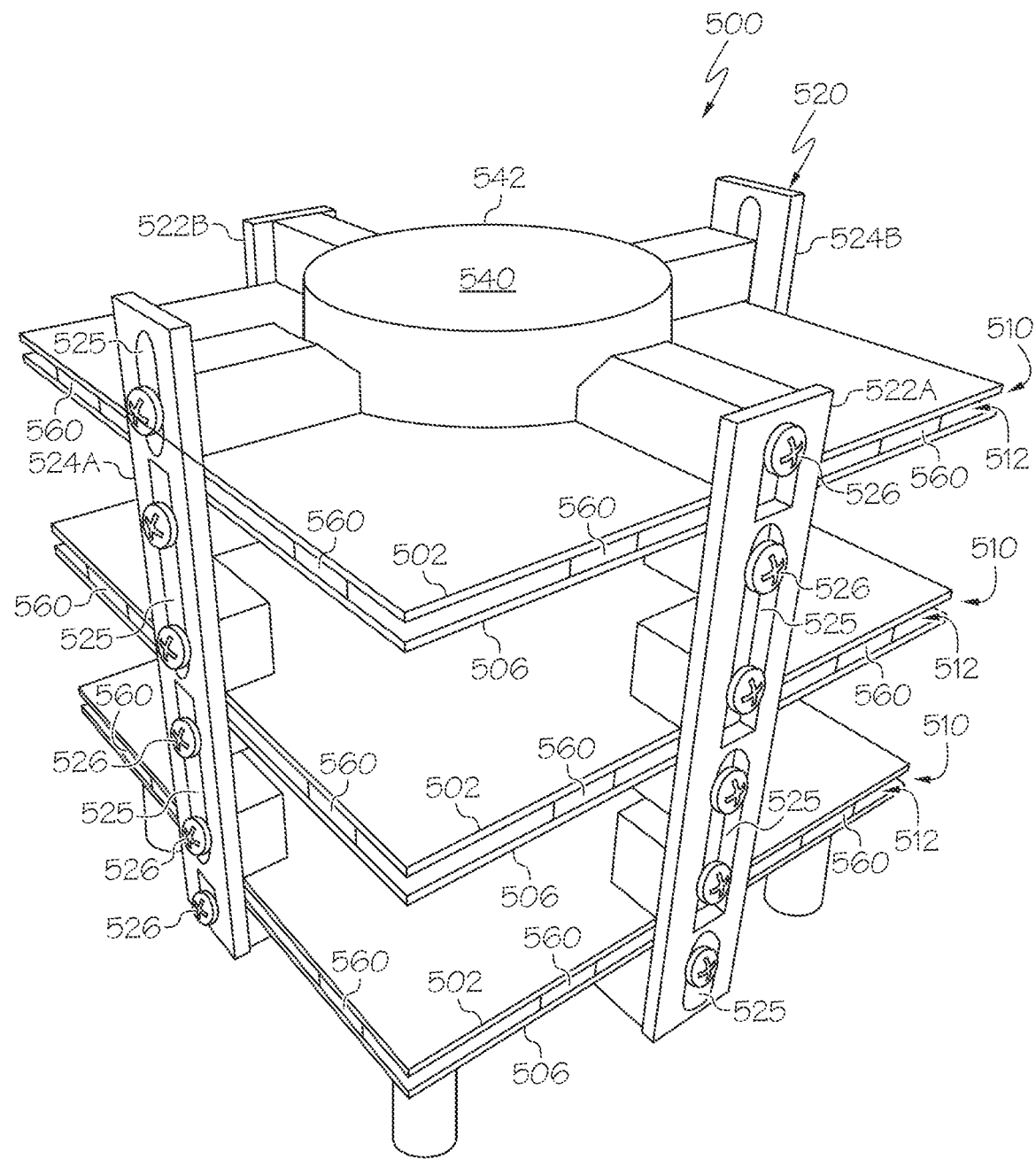
FIG. 10 schematically depicts an example layered actuation structure, according to one or more embodiments shown and described herein.
Figure 11:
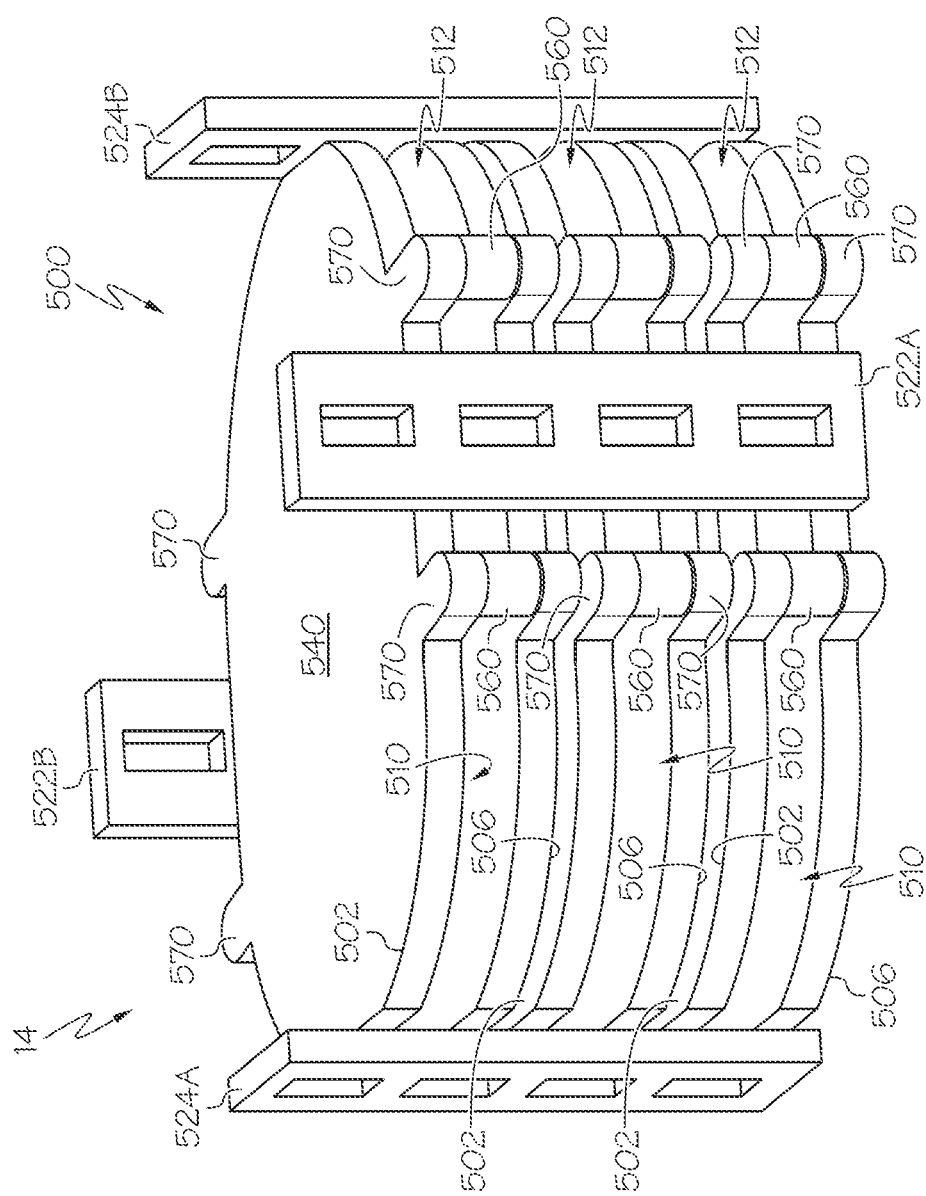
FIG. 11 schematically depicts another example layered actuation structure, according to one or more embodiments shown and described herein.

Referring to FIGS. 9A-11, in embodiments, the layered actuation structure 500 further includes one or more platform linking arms 520 that connect the platform pairs 510 to one another. The platform linking arms 520 retain the lateral positioning of platform pairs 510 (i.e., positioning in the X and Z directions), retain the spacing between the mounting platforms 506 of adjacent platform pairs 510 in the movement direction (i.e., in the Y direction) and allow for translational motion of the actuation platforms 502 of each platform pair 510 in the movement direction. As shown in FIGS. 10-11, in embodiments, the one or more platform linking arms 520 include a plurality of platform linking arms 520 that include at least one actuation arm 522 coupled to the one or more actuation platforms 502 and at least one support arm 524 coupled to the one or more mounting platforms 506. In particular, the actuation arm 522 is rigidly coupled to each actuation platform 502 and translatably coupled to each mounting platform 506 and the support arm 524 is rigidly coupled to each mounting platform 506 and translatably coupled to each actuation platform 502. This translatable connection may be a slideable connection. For example, as depicted in FIG. 10, the platform linking arms 520 may comprise a plurality of notches 525 to which provide a location for connectors 526, such as screws, to connect the platform linking arms 520 to the actuation platforms 502 and the mounting platforms 506 and also allow motion of the actuation platforms 502 during operation of the layered actuation structure 500 while retaining a connection between the platform linking arms 520 and the platform pairs 510. In some embodiments, the actuation platforms 502 and the mounting platforms 506 may comprise screw block sections, which are thicker than the remaining portion of each platform 502, 506 and provide a connection location for the connectors 526.

As depicted in FIGS. 10 and 11, in some embodiments, the layered actuation structure 500 comprises multiple support arms 524 and multiple actuation arms 522. For example, the layered actuation structure 500 may comprise a first support arm 524A, a second support arm 524B, a first actuation arm 522A, and a second actuation arm 522B. The first and second support arms 524A, 524B are each coupled to the one or more mounting platforms 506 and the first and second actuation arms 522A, 522B are each coupled to the one or more actuation platforms 502. The first support arm 524A and the second support arm 524B are coupled to the one or more mounting platforms 506 at opposite locations along an edge 507 of the one or more mounting platforms 506. The first actuation arm 522A and the second actuation arm 522B are coupled to the one or more actuation platforms 502 at opposite locations along an edge 503 of the one or more actuation platforms 502. Furthermore, the first and second support arms 524A, 524B are positioned relative the first and second actuation arms 522A, 522B such that an axis extending between the first support arm 524A and the second support arm 524B is orthogonal an axis extending between the first actuation arm 520A and the second actuation arm 520B.

Referring still to FIGS. 9A-11, the layered actuation structure 500 further comprises an actuation surface 540 configured to apply the cavity force (e.g., an individual cavity force or multi-cavity force) generated by the translational motion of the one or more actuation platforms 502. In some embodiments, the actuation surface 540 is a surface of an actuation block 542, which may be coupled to at least one actuation arm 522, as shown in FIGS. 9A and 9B, or coupled to an actuation platform 502 (e.g., the upward-most or endmost actuation platform 502), as shown in FIG. 10. In other embodiments, the actuation surface 540 may be a surface of an actuation platform 502 itself, as shown in FIG. 11.

In operation, when the one or more artificial muscles 100 apply pressure to the cavity-facing surfaces 504 of the one or more actuation platforms 502, the actuation platforms 502 translate relative to the mounting platforms 506 in the movement direction. That is, actuation the one or more artificial muscles 100 disposed in at least one of the actuation cavities 512 generates a translation motion of the one or more actuation platforms 502 along a cavity displacement distance 530. While the cavity displacement distance may be increased by increasing the number of layers of artificial muscles 100 in embodiments in which artificial muscle stacks are disposed in the actuation cavities 512, the cavity displacement distance 530 is not increased by increasing the number of platform pairs 510. However, the translation motion of an individual actuation platform 502 generates and individual cavity force, which is an additive force.

That is, when layered actuation structure 500 comprises a plurality of actuation cavities 512, such as in the embodiments depicted in FIGS. 9A and 9B, each individual actuation platform generates the individual cavity force such that the layered actuation structure generates a multi-cavity force. The multi-cavity force is an additive force of each of the individual cavity forces. In some embodiments, the multi-cavity force is 10 Newtons (N) or greater, such as 15 N or greater, 20 N or greater, 25 N or greater, 30 N or greater, 35 N or greater, 40 N or greater, 45 N or greater, 50 N or greater, 55 N or greater, 60 N or greater, 65 N or greater, 70 N or greater, 75 N or greater, 80 N or greater, 85 N or greater, 90 N or greater, 95 N or greater, 100 N or greater, 105 N or greater, 110 N or greater, 115 N or greater, 120 N or greater, or any range having any two of these values as endpoints. Indeed, embodiments are contemplated in which a layered actuation structure 500 comprising a 5 cm×5 cm lateral footprint is capable of generating a multi-cavity force of 80 N.

In the embodiment depicted in FIG. 10, the plurality of load-bearing supports 560 are disposed inward of one or more platform linking arms 520 within each one of the actuation cavities 512. In the depicted embodiment, each one of the actuation cavities 512 comprises 8 load-bearing supports 560 disposed therein (e.g., one on either side of the one or more platform linking arms 520 to provide robust, symmetrical support). It should be understood that alternative embodiments with differing number of load-bearing supports per actuation cavity are contemplated and within the scope of the present disclosure. For example, in embodiments, each actuation cavity 512 includes a single load-bearing support 560 disposed therein, and the load-bearing support 560 may include a frame-shaped member extending around the entire periphery of each actuation cavity 512. Embodiments are also envisioned where the plurality of actuation cavities 512 include different numbers of load-bearing supports 560 with different shapes and sizes.

In the embodiment depicted in FIG. 11, the plurality of load-bearing supports 560 are disposed outward of the actuation arms 522 and support arms 524. The plurality of mounting platforms 506 and the plurality of actuation platforms 502 each include a plurality of extension tabs 570 extending laterally outward from main bodies thereof such that each of the actuation cavities 512 has one or more sets of extension tabs 570 associated therewith. The plurality of load-bearing supports 560 may be disposed locally between the plurality of extension tabs 570 associated with the mounting platforms 506 and actuation platforms 502 of each actuation cavity 512. Such a structure beneficially facilitates the load-bearing supports 560 being laterally offset from the main bodies of the mounting platforms 506 and the actuation platforms 502. More artificial muscles may be placed within each actuation cavity 512 as a result of the extension tabs 570, beneficially increasing the density of force per overall unit weight of the actuation structure 500.

Figure 12:
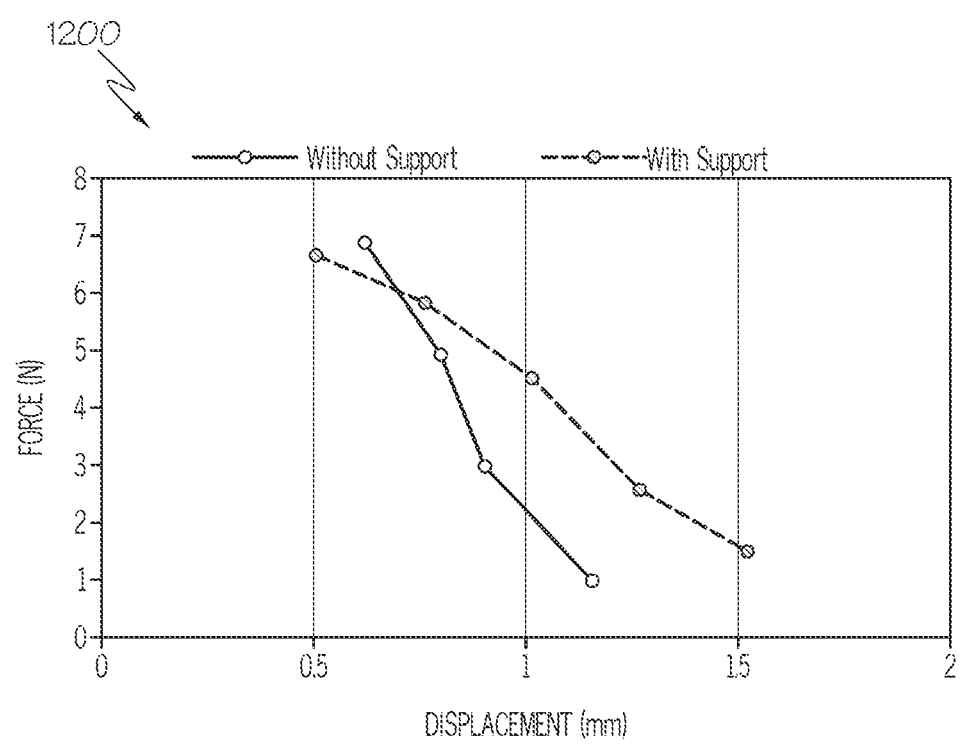
FIG. 12 depicts a plot of displacement vs. force for the artificial muscle depicted in FIGS. 2-4B when used in conjunction with a load-bearing support and the same artificial when not used in conjunction with a load-bearing support, according to one or more embodiments described herein.

Referring now to FIG. 12, a plot 1200 of force versus displacement for one of the plurality of artificial muscles 100 described herein. The plot 1200 depicts a magnitude of force provided by one of the artificial muscles 100 versus displacement in a case where a load-bearing support is used and a case where a load-bearing support is not used. In the case without the load-bearing support, the artificial muscle 100 encountered a force from an external force when in the non-actuated state described herein. As shown, the load-bearing support provides a greater force per unit displacement of the artificial muscle 100 (for certain displacements, the magnitude of force is greater than 30% improved). This example demonstrates the efficacy of the load-bearing supports described herein in improving actuation performance.

Referring now to FIG. 13, an actuation system 400 may be provided for operating each individual artificial muscle 100 of the layered actuation structure 500 or the artificial muscle 14 of the artificial muscle drive unit 10 described herein with respect to FIGS. 1A, 1B, and 1C. The actuation system 400 may comprise a controller 50, an operating device 46, a power supply 48, a display device 42, network interface hardware 44, and a communication path 41 communicatively coupled these components.

The controller 50 comprises a processor 52 and a non-transitory electronic memory 54 to which various components are communicatively coupled. In some embodiments, the processor 52 and the non-transitory electronic memory 54 and/or the other components are included within a single device. In other embodiments, the processor 52 and the non-transitory electronic memory 54 and/or the other components may be distributed among multiple devices that are communicatively coupled. The controller 50 includes non-transitory electronic memory 54 that stores a set of machine-readable instructions. The processor 52 executes the machine-readable instructions stored in the non-transitory electronic memory 54. The non-transitory electronic memory 54 may comprise RAM, ROM, flash memories, hard drives, or any device capable of storing machine-readable instructions such that the machine-readable instructions can be accessed by the processor 52. Accordingly, the actuation system 400 described herein may be implemented in any conventional computer programming language, as pre-programmed hardware elements, or as a combination of hardware and software components. The non-transitory electronic memory 54 may be implemented as one memory module or a plurality of memory modules.

In some embodiments, the non-transitory electronic memory 54 includes instructions for executing the functions of the actuation system 400. The instructions may include instructions for operating the layered actuation structure 500, for example, instructions for actuating the one or more artificial muscles 100, individually or collectively, and actuating the artificial muscle layers 210, 310, individually or collectively.

The processor 52 may be any device capable of executing machine-readable instructions. For example, the processor 52 may be an integrated circuit, a microchip, a computer, or any other computing device. The non-transitory electronic memory 54 and the processor 52 are coupled to the communication path 41 that provides signal interconnectivity between various components and/or modules of the actuation system 400. Accordingly, the communication path 41 may communicatively couple any number of processors with one another, and allow the modules coupled to the communication path 41 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 13, the communication path 41 communicatively couples the processor 52 and the non-transitory electronic memory 54 of the controller 50 with a plurality of other components of the actuation system 400. For example, the actuation system 400 depicted in FIG. 11 includes the processor 52 and the non-transitory electronic memory 54 communicatively coupled with the operating device 46 and the power supply 48.

The operating device 46 allows for a user to control operation of the artificial muscles 100 of the layered actuation structure 500. In some embodiments, the operating device 46 may be a switch, toggle, button, or any combination of controls to provide user operation. The operating device 46 is coupled to the communication path 41 such that the communication path 41 communicatively couples the operating device 46 to other modules of the actuation system 400. The operating device 46 may provide a user interface for receiving user instructions as to a specific operating configuration of the layered actuation structure 500.

The power supply 48 (e.g., battery) provides power to the one or more artificial muscles 100 of the layered actuation structure 500. In some embodiments, the power supply 48 is a rechargeable direct current power source. It is to be understood that the power supply 48 may be a single power supply or battery for providing power to the one or more artificial muscles 100 of the layered actuation structure 500. A power adapter (not shown) may be provided and electrically coupled via a wiring harness or the like for providing power to the one or more artificial muscles 100 of the layered actuation structure 500 via the power supply 48. Indeed, the power supply 48 is a device that can receive power at one level (e.g., one voltage, power level, or current) and output power at a second level (e.g., a second voltage, power level, or current).

In some embodiments, the actuation system 400 also includes a display device 42. The display device 42 is coupled to the communication path 41 such that the communication path 41 communicatively couples the display device 42 to other modules of the actuation system 400. The display device 42 may be a touchscreen that, in addition to providing optical information, detects the presence and location of a tactile input upon a surface of or adjacent to the display device 42. Accordingly, the display device 42 may include the operating device 46 and receive mechanical input directly upon the optical output provided by the display device 42.

In some embodiments, the actuation system 400 includes network interface hardware 44 for communicatively coupling the actuation system 400 to a portable device 70 via a network 60. The portable device 70 may include, without limitation, a smartphone, a tablet, a personal media player, or any other electric device that includes wireless communication functionality. It is to be appreciated that, when provided, the portable device 70 may serve to provide user commands to the controller 50, instead of the operating device 46. As such, a user may be able to control or set a program for controlling the artificial muscles 100 of the layered actuation structure 500 utilizing the controls of the operating device 46. Thus, the artificial muscles 100 of the layered actuation structure 500 may be controlled remotely via the portable device 70 wirelessly communicating with the controller 50 via the network 60.

It should now be understood that embodiments described herein are directed to a layered actuation structure having one or more actuation platforms interleaved with one or more mounting platforms forming platform pairs. Artificial muscles are disposed in an actuation cavity of each platform pair and are expandable on demand to selectively raise the actuation platforms. The translational motion of each of the one or more actuation platforms generates an additive force that may be increased by adding additional platform pairs to the layered actuation structure. Each additional platform pair of the layered actuation structure increases the achievable maximum force without increasing the total displacement that occurs during actuation. Thus, the layered actuation structure is useful in small footprint applications, particular small lateral footprint applications.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An artificial muscle drive unit comprising:
an artificial muscle, the artificial muscle comprising an expandable reservoir and a fluid, wherein the fluid is movable within said expandable reservoir to switch the artificial muscle between a non-actuated state in which a dimension of the artificial muscle in a movement direction is a minimum value, and an actuated state, in which the dimension of the artificial muscle is a maximum value, a first distance between the expandable reservoir and a load source in the movement direction when the artificial muscle is in the non-actuated state being greater than a second distance between the expandable reservoir and the load source in the movement direction when the artificial muscle is in the actuated state; and a load-bearing support, the load-bearing support comprising a surface that is positioned more proximate to the load source in the movement direction than the expandable reservoir when the expandable reservoir is in the non-actuated state.

2. The artificial muscle drive unit of claim 1, wherein:
the load-bearing support and artificial muscle are disposed on a base, and
the load-bearing support is offset from the expandable reservoir on the base.

3. The artificial muscle drive unit of claim 2, further comprising an actuation platform held in spaced relation to the base, wherein upon actuation of the artificial muscle from the non-actuated state, the expandable reservoir moves the actuation platform in the movement direction by a stroke distance.

4. The artificial muscle drive unit of claim 3, wherein the expandable reservoir and the actuation platform are offset by an offset distance in the movement direction when the artificial muscle is in the non-actuated state such that the artificial muscle initially contacts the actuation platform in a partially actuated state in which the distance between an external surface of the expandable reservoir and the base is between the minimum value and the maximum value.

5. The artificial muscle drive unit of claim 3, wherein the offset distance is greater than the minimum value.

6. The artificial muscle drive unit of claim 3, further comprising a plurality of load-bearing supports configured to maintain the actuation platform in a resting orientation relative to the base when the artificial muscle is in the non-actuated state.

7. The artificial muscle drive unit of claim 6, wherein the actuation platform extends perpendicular to the movement direction in the resting orientation.

8. The artificial muscle drive unit of claim 1, wherein the artificial muscle comprises a housing comprising an electrode region and an expandable fluid region, the expandable fluid region of the housing corresponding to the expandable reservoir.

9. The artificial muscle drive unit of claim 8, wherein:
the artificial muscle further comprises an electrode pair positioned in the electrode region of the housing, the electrode pair comprising a first electrode fixed to a first surface of the housing and a second electrode fixed to a second surface of the housing;
the fluid comprises a dielectric fluid; and
the electrode pair is actuatable between the non-actuated state and the actuated state such that actuation from the non-actuated state to the actuated state directs the dielectric fluid into the expandable fluid region, expanding the expandable fluid region in the movement direction.

10. The artificial muscle drive unit of claim 9, wherein:
the first electrode and the second electrode each comprise two or more tab portions and two or more bridge portions;
each of the two or more bridge portions interconnects adjacent tab portions; and
at least one of the first electrode and the second electrode comprises a central opening positioned between the two or more tab portions and encircling the expandable fluid region.

11. The artificial muscle drive unit of claim 1, wherein the artificial muscle drive unit comprises a plurality of artificial muscles stacked on one another in the movement direction.

12. The artificial muscle drive unit of claim 11, wherein the dimension of the load-bearing support in the movement direction is greater than or equal to a combined height of the plurality of artificial muscles in the movement direction when all of the plurality of artificial muscles are in the non-actuated state.

13. An artificial muscle device comprising:
one or more actuation platforms interleaved with one or more mounting platforms to form one or more actuation cavities between one or more platform pairs, each platform pair comprising an individual mounting platform and an individual actuation platform; and
one or more artificial muscles disposed in each of the one or more actuation cavities, the one or more artificial muscles comprising an expandable reservoir and a fluid, wherein the fluid is movable within the expandable reservoir to actuate the one or more artificial muscles between a non-actuated state in which a dimension of the one or more artificial muscles in a movement direction is a minimum value, and an actuated state, in which the dimension is a maximum value in the movement direction, a first distance between a respective expandable reservoir of a respective artificial muscle of the one or more artificial muscles and a respective actuation platform of the one or more actuation platforms in the movement direction when the respective artificial muscle is in the non-actuated state being greater than a second distance between the respective expandable reservoir and the respective actuation platform in the movement direction when the respective artificial muscle is in the actuated state; and
a load-bearing support disposed in at least one of the one or more actuation cavities, the load-bearing support comprising a dimension in the movement direction that is greater than or equal to the minimum value.

14. The artificial muscle device of claim 13, wherein the one or more artificial muscles disposed in each of the one or more actuation cavities comprise:
a housing comprising an electrode region and an expandable fluid region, wherein the fluid comprises a dielectric fluid housed within the housing; and an electrode pair comprising a first electrode and a second electrode positioned in the electrode region of the housing, wherein the electrode pair is actuatable between the non-actuated state and the actuated state such that actuation from the non-actuated state to the actuated state directs the dielectric fluid into the expandable fluid region, expanding the expandable fluid region thereby applying pressure to the one or more actuation platforms, generating translational motion of the one or more actuation platforms.

15. The artificial muscle device of claim 14, wherein the one or more artificial muscles disposed in each of the one or more actuation cavities comprise an artificial muscle stack comprising:

a plurality of artificial muscle layers each comprising one or more artificial muscles, wherein the one or more artificial muscles each comprise two or more tab portions and two or more bridge portions, wherein:
   each of the two or more bridge portions interconnects adjacent tab portions; and
   at least one of the first electrode and the second electrode comprises a central opening positioned between the two or more tab portions and encircling the expandable fluid region; and
   the plurality of artificial muscle layers are arranged such that the expandable fluid region of the one or more artificial muscles of each artificial muscle layer overlaps at least one tab portion of one or more artificial muscles of an adjacent artificial muscle layer.

16. The artificial muscle device of claim 15, wherein the dimension of the load-bearing support in the movement direction is greater than or equal to a combined height of the plurality of artificial layers when the one or more artificial muscles of the plurality of artificial layers are in the non-actuated state.

17. The artificial muscle device of claim 13, wherein the expandable reservoir of the one or more artificial muscles in each actuation cavity and the actuation platform are offset in the movement direction by an offset distance when the one or more artificial muscles are in the non-actuated state such that the one or more artificial muscles initially contact the actuation platform in a partially actuated state in which the distance between the external surface of the expandable reservoir and the loading platform is between the minimum value and the maximum value.

18. A method of actuating an artificial muscle drive unit, the method comprising:
   positioning the artificial muscle drive unit relative to a load source such that the load source imparts a force on a load-bearing support of the artificial muscle drive unit, wherein the load-bearing support is positioned relative to an artificial muscle of the artificial muscle drive unit such that the force is not directly imparted on an expandable reservoir of the artificial muscle when the artificial muscle is in a non-actuated state, a first distance provided between the expandable reservoir and the load source in a movement direction when the artificial muscle is in the non-actuated state; and
   manipulating a fluid disposed within the expandable reservoir of the artificial muscle such that at least a portion of the expandable reservoir expands in the movement direction prior to encountering the force imparted on the load-bearing support and continues to expand in the movement direction upon encountering the force imparted by the load-bearing support, thereby imparting an artificial muscle force on the load source, a second distance between the expandable reservoir and the load source in the movement direction when the artificial muscle is in the actuated state being less than the first distance.

19. The method of claim 18, wherein the manipulating the fluid disposed within the expandable reservoir comprises:
   providing a voltage using a power supply electrically coupled to an electrode pair of the artificial muscle wherein:
      the artificial muscle comprises a housing having an electrode region and an expandable fluid region, the expandable fluid region corresponding to the expandable reservoir;
      the electrode pair is positioned in the electrode region of the housing;
      the electrode pair comprises a first electrode fixed to a first surface of the housing and a second electrode fixed to a second surface of the housing; and
      the fluid comprises a dielectric fluid housed within the housing; and
   applying the voltage to the electrode pair of the artificial muscle, thereby actuating the electrode pair from a non-actuated state to an actuated state such that the dielectric fluid is directed into the expandable fluid region of the housing and expands the expandable fluid region, thereby providing the artificial muscle force.

20. The method of claim 18, wherein:
the artificial muscle is one of a plurality of artificial muscles stacked in the movement direction,
the artificial muscle drive unit comprises a base and an actuation platform,
the plurality artificial muscles and the load-bearing support are disposed between the base and the actuation platform, and
the load-bearing support comprises a dimension in the movement direction that is greater than a combined height of the plurality of artificial muscles in the non-actuated state such that the load-bearing support provides an offset between the plurality of artificial muscles and the actuation platform despite the force being imparted on the actuation platform by the load source.

* * * * *